(12) United States Patent
Ostertag et al.

(10) Patent No.: US 7,337,401 B2
(45) Date of Patent: Feb. 26, 2008

(54) USER INTERFACE ELEMENT REPRESENTATION WITH SIMPLIFIED VIEW

(75) Inventors: Peter Francis Ostertag, Woodinville, WA (US); Mark James Finocchio, Redmond, WA (US); Michael Edward Dulac Winser, Westport, CT (US); Benjamin Franklin Wang Jen-Shong Carter, Redmond, WA (US); Nicholas Kramer, Seattle, WA (US); Samuel Watkins Bent, Bellevue, WA (US); Namita Gupta, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 795 days.

(21) Appl. No.: 10/323,504

(22) Filed: Dec. 18, 2002

(65) Prior Publication Data

US 2004/0122789 A1 Jun. 24, 2004

(51) Int. Cl.
 *G06F 3/00* (2006.01)
 *G06F 3/048* (2006.01)
 *G06F 15/16* (2006.01)
 *G06F 15/173* (2006.01)
(52) U.S. Cl. ............ 715/713; 715/807; 715/853; 709/200; 709/225
(58) Field of Classification Search ............ 715/514, 715/713, 826, 853, 743, 745, 747, 807; 709/200, 709/225
See application file for complete search history.

(56) References Cited

U.S. PATENT DOCUMENTS

| | | | |
|---|---|---|---|
| 5,588,099 A | | 12/1996 | Mogilevsky et al. |
| 5,606,654 A | * | 2/1997 | Schuur ............ 715/853 |
| 5,649,222 A | | 7/1997 | Mogilevsky |
| 5,860,073 A | | 1/1999 | Ferrel et al. |
| 5,953,724 A | * | 9/1999 | Lowry ............ 715/853 |
| 6,029,170 A | | 2/2000 | Garger et al. |
| 6,061,679 A | | 5/2000 | Bournas et al. |
| 6,108,698 A | * | 8/2000 | Tenev et al. ............ 715/853 |
| 6,128,016 A | * | 10/2000 | Coelho et al. ............ 715/854 |
| 6,169,546 B1 | | 1/2001 | Bogdan |
| 6,169,984 B1 | | 1/2001 | Bogdan |
| 6,249,284 B1 | | 6/2001 | Bogdan |
| 6,505,205 B1 | | 1/2003 | Kothuri et al. |
| 6,662,342 B1 | | 12/2003 | Marcy |
| 6,671,853 B1 | | 12/2003 | Burkett et al. |

(Continued)

OTHER PUBLICATIONS

How to Use Microsoft Windows NT 4 Workstation, Screen Shots 1-4, publication date 1996.*

(Continued)

*Primary Examiner*—Weilun Lo
*Assistant Examiner*—Truc T. Chuong
(74) *Attorney, Agent, or Firm*—Klarquist Sparkman, LLP

(57) ABSTRACT

A composite user interface element can be assembled from plural sub-elements. A simplified view of the representation of the user interface element can be provided wherein the composited user interface element appears to be a single element. When defined, various nodes for representing the user interface can be designated as selectively exposable. Such selectively exposable nodes can be ignored when performing operations via the simplified view. Accordingly, programmers can write code that need not take the complexity of the composite user interface element into account. Property determination can be done in light of the selectively exposable nodes. A simplified view can support nested user interface elements having respective selectively exposable nodes.

30 Claims, 26 Drawing Sheets

U.S. PATENT DOCUMENTS

| | | | |
|---|---|---|---|
| 6,732,109 | B2 | 5/2004 | Lindberg et al. |
| 6,772,165 | B2 | 8/2004 | O'Carroll |
| 6,775,678 | B1 | 8/2004 | Hillberg et al. |
| 6,883,137 | B1 | 4/2005 | Girardot et al. |
| 6,910,040 | B2 | 6/2005 | Emmick et al. |
| 7,039,863 | B1 | 5/2006 | Caro et al. |
| 2002/0059349 | A1* | 5/2002 | Wakita et al. .............. 707/517 |
| 2002/0138517 | A1 | 9/2002 | Mory et al. |

OTHER PUBLICATIONS

"XSLTC Internal DOM," The Apache Software Foundation, copyright 2001 as retrieved on the Internet from http://xml.apache.org/xalan-i/xsltc/xsltc_dom.html, 7 pages, dated Sep. 23, 2001 as retrieved from the Wayback Machine.

"About Viewlink CSS Inheritance," http://msdn.microsoft.com/workshop/author/behaviors/overview/viewlink_ovw_css.asp, pp. 1-3, Dec. 17, 2002.

"About Viewlink Event Routing," http://msdn.microsoft.com/workshop/author/behaviors/overview/viewlink_ovw_events.asp, pp. 1-3, Dec. 17, 2002.

"Benefits of using ViewLink," http://msdn.microsoft.com/workshop/samples/author/behaviors/overview/vlcomparison.htm, p. 1, Dec. 17, 2002.

"CreateTextRange Method," http://msdn.microsoft.com/workshop/author/dhtml/reference/methods/createtextrange.asp, pp. 1-2, Dec. 17, 2002.

"Introduction to Markup Services," http://msdn.microsoft.com/workshop/browser/mshtml/overview/intromarkupsvc.asp, pp. 1-12, Feb. 12, 2002.

"Introduction to ViewLink," http://msdn.microsoft.com/workshop/author/behaviors/overview/viewlink_ovw.asp, pp. 1-9, Dec. 17, 2002.

"Microsoft Brandishes its Trident," http://news.com.com/2100-1001-239879.html?tag=mainstry, pp. 1-2, Oct. 21, 1996.

"Splay tree," http://searchdatabase.techtarget.com/sDefinition/0,,sid13_gci511191,00.html, pp. 1-3, Feb. 12, 2002.

"TextRange Object: Members Table: Attributes/Properties," http://msdn.microsoft.com/workshop/author/dhtml/reference/objects/obj_textrange.asp, pp. 1-2, Dec. 17, 2002.

"TextRange Object: Members Table: Methods," http://msdn.microsoft.com/workshop/author/dhtml/reference/objects/obj_textrange.asp, pp. 1-3, Dec. 17, 2002.

"Viewlink Behaviors," http://msdn.microsoft.com/workshop/author/behaviors/overview/viewlink_ovw_entry.asp, pp. 1, Dec. 17, 2002.

"W3C, XForms 1.0, W3C Working Draft," http://www.w3.org/TR/2002/WD-xforms-20020118, pp. 1-97, Jan. 18, 2002.

"What is XUL?" Chapter 1, pp. 1-18, Jul. 10, 2001.

"XBL-XML Binding Language," http://www.w3.org/TR/xbl/, Hyatt (ed.), pp. 1-35, Feb. 23, 2001.

"XForms-The Next Generation of Web Forms," http://www.w3.org/MarkUp/Forms/, pp. 1-6, 2001.

Henrich, "A Hybrid Split Strategy for k-d-Tree Based Access Structures," *ACM Proceedings of the Fourth ACM Workshop on Advances in Geographic Information Systems*, pp. 1-8, 1997.

Khuller et al., "Graph and Network Algorithms," *The Computer Science and Engineering Handbook*, Tucker, Jr. (ed.), pp. 203-225, 1997.

Manohararajah, "Parallel Alpha-Beta Search on Shared Memory Multiprocessors," pp. 1-92, Apr. 24, 2002.

McEneaney, "Visualizing and Assessing Navigation in Hypertext," *ACM Proceedings of the Tenth ACM Conference on Hypertext and Hypermedia: Returning to our Diverse Roots*, pp. 61-70, 1999.

Samet, *The Design and Analysis of Spatial Data Structures*, Addison-Wesley, Reading, MA, pp. 240-257, 1990.

Tamassia et al., "Data Structures," *The Computer Science and Engineering Handbook*, Tucker, Jr. (ed.), pp. 86-110, 1997.

Turbak, "Slivers: computational Modularity via Synchronized Lazy Aggregates," http://nike.wellesley.edu/~fturbak/pubs/phd/, pp. 1-2, Apr. 24, 2002.

Yao, "Tree Structures Construction Using Key Densities," *ACM Proceedings of the 1975 Annual Conference*, pp. 337-342, 1975.

* cited by examiner

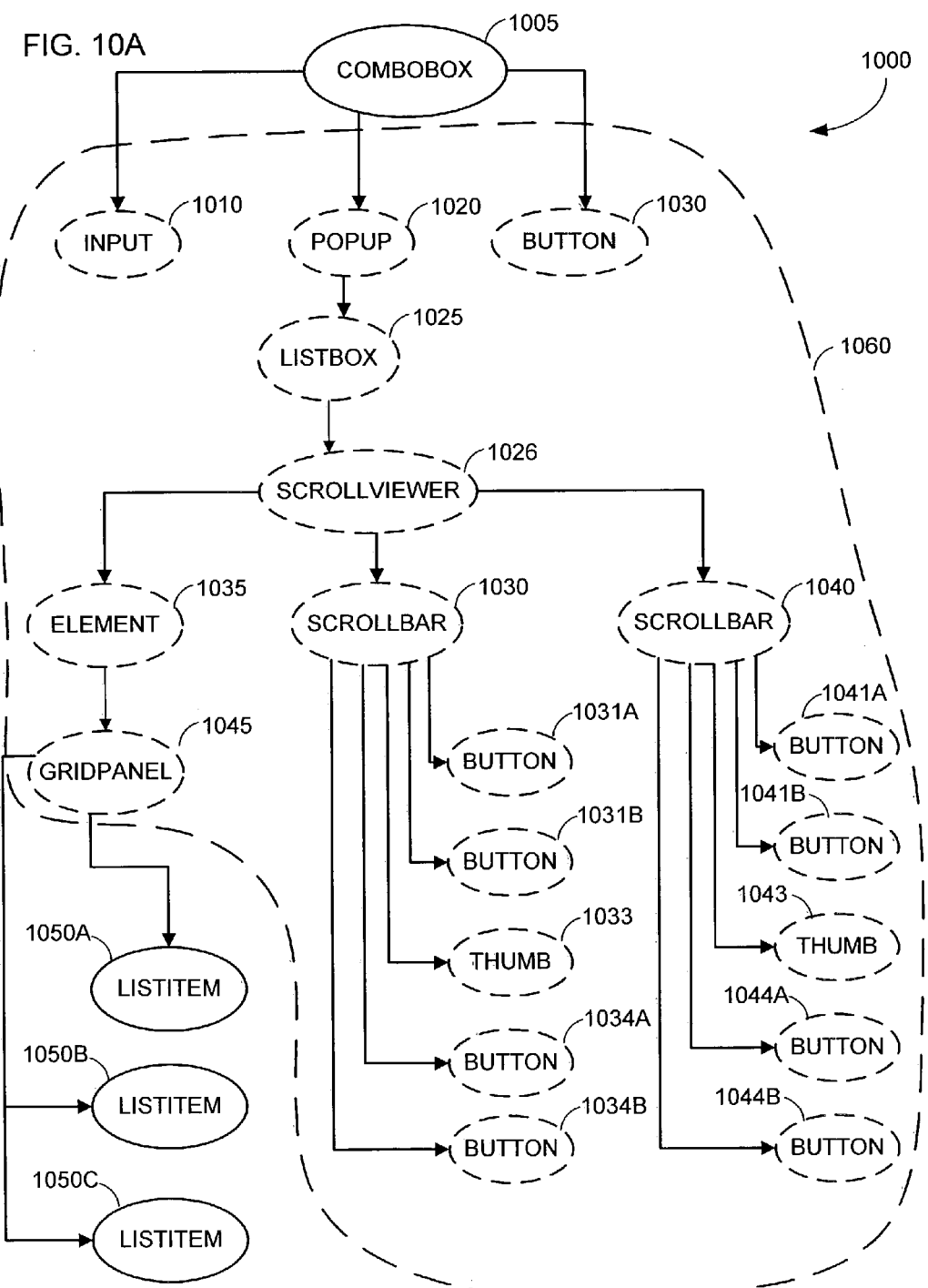

```
<COMBOBOX ISENCAPSULATINGPARENT="TRUE">
  <INPUT />
  <BUTTON />
    <POPUP>
   <LISTBOX ISENCAPSULATINGPARENT="TRUE"
     ISENCAPSULATINGCONTAINER="TRUE">
     <SCROLLVIEWER ISENCAPSULATINGPARENT="TRUE">
       <SCROLLBAR ISENCAPSULATINGPARENT="TRUE">
         <BUTTON />
         <BUTTON />
         <THUMB />
         <BUTTON />
         <BUTTON />
       <SCROLLBAR />
       <SCROLLBAR ISENCAPSULATINGPARENT="TRUE">
         <BUTTON />
         <BUTTON />
         <THUMB />
         <BUTTON />
         <BUTTON />
       <SCROLLBAR />
       <ELEMENT ISENCAPSULATINGCONTAINER="TRUE">
         <GRIDPANEL ISENCAPSULATINGCONTAINER="TRUE" >
           <LISTITEM>ITEM1</LISTITEM>
           <LISTITEM>ITEM2</LISTITEM>
           <LISTITEM>ITEM3</LISTITEM>
         </GRIDPANEL>
       </ELEMENT>
     </SCROLLVIEWER>
   </LISTBOX>
  </POPUP>
</COMBOBOX>
```

FIG. 13

```
CLASS COMBOBOX : CONTROL
{
  PUBLIC COMBOBOX()
  {
    ELEMENTS.ADD(NEW INPUT());
    ELEMENTS.ADD(NEW BUTTON());

// CREATE A POPUP CONTROL CONTAINING A LISTBOX
    POPUP POPUP = NEW POPUP());
    LISTBOX LISTBOX = NEW LISTBOX();
    POPUP.ELEMENTS.ADD(LISTBOX);
    THIS.ELEMENTS.ADD(POPUP);

// SETUP ENCAPSULATION SO THAT THE COMBOBOX'S PUBLIC
    // CHILDREN COME FROM THE LISTBOX
    THIS.ISENCAPSULATINGPARENT = TRUE;
    LISTBOX.ISENCAPSULATINGCONTAINER = TRUE;
  }
}

CLASS LISTBOX : CONTROL
{
  PUBLIC LISTBOX()
  {
    // CREATE A SCROLLVIEWER CONTAINING A GRIDPANEL, AND
    // ADD THIS THE LISTBOX'S CHILD
    GRIDPANEL GRIDPANEL = NEW GRIDPANEL();
    SCROLLVIEWER SCROLLVIEWER = NEW SCROLLVIEWER();
    SCROLLVIEWER.ELEMENTS.ADD(GRIDPANEL);
    THIS.ELEMENTS.ADD(SCROLLVIEWER);

// SETUP ENCAPSULATION SO THAT THE LISTBOX'S PUBLIC
    // CHILDREN COME FROM THE GRIDPANEL WITHIN THE
    // SCROLLVIEWER
    THIS.ISENCAPSULATINGPARENT = TRUE;
    GRIDPANEL.ISENCAPSULATINGCONTAINER = TRUE;
  }
}
```

FIG. 14A

```
CLASS SCROLLVIEWER : CONTROL
{
   PUBLIC SCROLLVIEWER()
   {
      ELEMENTS.ADD(NEW SCROLLBAR());  // HORIZONTAL SCROLLBAR
      ELEMENTS.ADD(NEW SCROLLBAR());  // VERTICAL SCROLLBAR

// CREATE A NEW ELEMENT AND SET THIS UP AS THE
      // ENCAPSULATING CONTAINER TO THIS ENCAPSULATING PARENT
      ELEMENT CONTAINER = NEW ELEMENT();
      THIS.ELEMENTS.ADD(CONTAINER);
      THIS.ISENCAPSULATINGPARENT = TRUE;
      CONTAINER.ISENCAPSULATINGCONTAINER = TRUE;
   }
}

CLASS SCROLLBAR : CONTROL
{
   PUBLIC SCROLLBAR()
   {
      ELEMENTS.ADD(NEW BUTTON());
      ELEMENTS.ADD(NEW BUTTON());
      ELEMENTS.ADD(NEW THUMB());
      ELEMENTS.ADD(NEW BUTTON());
      ELEMENTS.ADD(NEW BUTTON());
      ISENCAPSULATINGPARENT = TRUE;
   }
}
```

FIG. 14B

```
<LISTBOX>
    <REPEATER DATACOLLECTION = "%BINDTO;">
        <LISTITEM>
            <TEXT BINDING.TEXTCONTENT=
                "%BINDTO;CUSTOMERNAME"/>
        </LISTITEM>
    </REPEATER>
</LISTBOX>
```

FIG. 25

```
LISTBOX ALISTBOX =NEW LISTBOX();
REPEATER AREPEATER = NEW REPEATER();

// CREATE THE TEMPLATE.  HERE THE TEMPLATE IS A
    // LISTITEM CONTAINING TEXT BOUND
    // TO THE 'CUSTOMERNAME' FIELD OF THE DATA ENTITY.

TEMPLATE ATEMPLATE = NEW TEMPLATE();
    TEXT TEXTELEMENT = NEW TEXT(ATEMPLATE);
    BINDING.SETBINDING(TEXTELEMENT,
         BINDING.TEXTCONTENTPROPERTY,
         "CUSTOMERNAME");
    AREPEATER.DEFAULTTEMPLATE = ATEMPLATE;

// ADD THE REPEATER AS A CHILD OF THE LISTBOX
ALISTBOX.FULLELEMENTS.ADD(AREPEATER);
```

FIG. 26

USER INTERFACE ELEMENT REPRESENTATION WITH SIMPLIFIED VIEW

TECHNICAL FIELD

The technical field relates to internal representation of user interface elements.

BACKGROUND OF THE INVENTION

With the proliferation of computers has come innovation in the area of software user interfaces. For example, there are many tools now available by which user interfaces can be created and manipulated by programmers. Further, user interface elements can now be placed in documents, such as web pages or word processing documents.

User interface elements can take many forms: edit boxes, list boxes, scroll bars, pick lists, pushbuttons, and the like. Although the user interface element may appear to the user as a single composite item, it may actually be represented in the computer as a number of separate items or sub-elements that have been combined together. Furthermore, each of these sub-elements themselves can be composited from other sub-elements. In this manner, user interface elements can serve as building blocks for building other, more complex, user interface elements. Such an approach is useful because the software managing the user interface (e.g., the user interface framework) can re-use the definitions of certain common elements when assembling them into composite elements.

However, the complexity introduced by representing user interface elements as composite user interface elements can be problematic. For example, new or casual programmers may not wish to acquaint themselves with how a composite user interface is assembled, or even that the composite user interface is composite in the first place. Such programmers might rather avoid such complexity when dealing with the composite user interface elements. Indeed, even an experienced programmer may wish to avoid dealing with such complexity. Thus, there is a need to somehow simplify representations of composite user interface elements.

SUMMARY OF THE INVENTION

As described herein, a simplified view of a representation of one or more user interface elements can be provided. For example, some nodes representing user interface elements in a hierarchical representation can be selectively exposable. Such nodes can be exposed under certain circumstances and unexposed under other circumstances. In this exemplary way, a simplified representational view (e.g., not exposing the selectively exposable nodes) can be provided.

In one implementation, when providing user interface services, various operations can be performed on a simplified view of a representation of the user interface. For example, when performing operations, selectively exposable nodes can be unexposed. Such an approach can be useful for a programmer who does not wish to become acquainted with the details of the representation.

For instance, plural user interface elements can be composited into a single composite unit upon which operations can be performed. The fact that the composite unit is composed of plural user interface elements can be transparent in a simplified view of the user interface elements' representation. A program can thus investigate and manipulate the representation without regard to the unexposed nodes. As a result, a programmer can write simpler code or markup. And, the programmer need not be completely familiar with the underlying structure, which may contain more than one node for the composite unit.

A user interface service providing a simplified view can thus provide a powerful tool by which software re-use is encouraged, and unsophisticated users can interact with the user interface elements on a basic level.

Additional features and advantages will be made apparent from the following detailed description of illustrated embodiments, which proceeds with reference to the accompanying drawings.

BRIEF DESCRIPTION OF THE DRAWINGS

FIG. 10A is a depiction of an exemplary hierarchical representation of a combo box, such as that shown in FIG. 9.

FIG. 13 is an exemplary markup definition for a combo box including indication of at least one element as selectively exposable.

FIG. 14A is an exemplary programmatic definition for a combo box including indication of at least one element as selectively exposable.

FIG. 14B is the continuation of the exemplary markup definition of FIG. 14A.

FIG. 25 is an exemplary markup invocation of a repeater designated as selectively exposable.

FIG. 26 is an exemplary programmatic invocation of a repeater designated as selectively exposable.

DETAILED DESCRIPTION OF THE INVENTION

Overview

Figure 1:
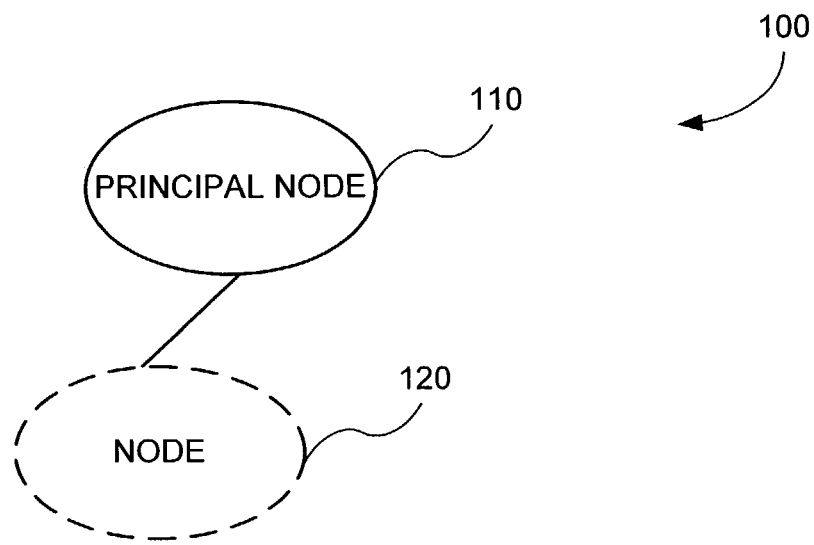
FIG. 1 is a depiction of an exemplary representation of a user interface element having a simplified view.

The various technologies described herein are useful for creating, presenting, and manipulating user interface elements. User interface elements can take many forms, such as graphical pushbuttons, edit boxes, scroll bars, picklists, drop down menus, ACTIVEX controls, images and the like. User interface elements can appear as part of a program (e.g., to control functionality of the program) or within a document. A simplified view of the internal representation of such user interface elements can make programming for user interface elements simpler. For example, a casual or unsophisticated programmer can write a program interacting with the simplified view without having to become familiar with certain complexities. Also, a more sophisticated programmer may wish to be shielded from such complexities to avoid possible programming mistakes.

If desired, the technologies described herein (e.g., the simplified view) can be provided as part of a user interface service. Programs interacting with the service can thus take advantage of the features as desired.

In certain embodiments, a user interface element can be defined as having a hierarchical representation with a simplified view. Such a definition can be invoked to create the hierarchical representation with the simplified view. Subsequently, an operation can be performed on the hierarchical representation. Such an operation can be performed on either a full or a simplified view of the hierarchical representation.

If a user interface element is a composite user interface element comprising plural user interface elements, a principal (e.g., parent) node can be exposed, and the other nodes for the composite user interface element can be defined as selectively exposable. When unexposed, the view of the representation shows the principal node, but not the other, selectively exposable nodes. Thus, one node can be exposed for the composite user interface element rather than a plurality of nodes.

The full view of a representation of a composite user interface element may be relatively complex in that there may be a plurality of nodes in the hierarchical representation representing the user interface element. A programmer wishing to manipulate the full view is faced with becoming acquainted with the various nodes and their hierarchical relationships. As described herein, a program can instead perform operations using the simplified view.

In the simplified view, unexposed nodes can be ignored when performing operations on a node (e.g., a parent or child node in a hierarchy). For example, when adding children to a node, unexposed intermediate nodes can be ignored or skipped. Thus, a request to add children to a node in the simplified view of the hierarchical representation of the user interface can actually result in an addition of the children to an appropriate child node (e.g., representing an element of the composite user interface element) of the node. Such an approach is useful because adding children in the simplified view does not require knowledge of the complexities of the plural nodes forming the user interface element and their interrelationships.

For example, a list box may be represented as a plurality of nodes in a hierarchical relationship, and one of the nodes may be designated as the particular node to receive displayed choices for the list box as children nodes. However, a programmer might not wish to become familiar with such complexities.

Using the simplified view, such an operation can easily be performed by adding the additional user choices as children of the principal node of the user interface element (e.g., via the simplified view). In the simplified view, the request to add children to the principal node is implemented as a request to add children to the appropriate node (e.g., a descendant of the principal node). In this way, the program can use the simplified representation of the user interface element to perform operations on the user interface element. As a result, the programmer need not become acquainted with the complexities of the full view, and simpler code or markup can be used.

One way of implementing a simplified view is to define various nodes in the representation as encapsulating parents or encapsulating containers. In this way, a particular node can be designated as a principal node (e.g., the encapsulating parent), and another (e.g., child) node can be designated as the particular node to receive children (e.g., if the parent node has or will have children in the simplified view).

Another way of implementing the simplified view is to define a selectively exposable node in such a way that its children are considered siblings of the siblings of the selectively exposable node in the simplified view.

As described herein, a number of operations other than adding children can be performed to learn about or manipulate a user interface element representation. In addition, operations can be performed on any node in the representation and still take advantage of the simplified view.

Still further, property values can be determined (e.g., for added nodes) in light of the selectively exposable nodes. In some cases, it may be desirable to use property values associated with a principal node (e.g., ignoring the selectively exposable nodes), the immediate (e.g., unexposed) parent, or a combination thereof.

Because some detail concerning the user interface element representation is hidden, the principal node and the selectively exposable nodes for a composite user interface element are sometimes said to form an "encapsulated" user interface element.

A program or markup language interacting with the simplified view can be shielded from some of the complexity of the underlying representation. Thus, a composite user interface element can be assembled of a plurality of user interface element without introducing additional complexity for the program using the composite user interface. Such an approach can be useful in that it can encourage user interface element developers to re-use existing user interface elements when creating new ones without introducing unnecessary complexity when dealing with the user interface element. Further, nesting of definition specifying selectively exposable nodes can be supported.

Exemplary Hierarchical Representation of a User Interface Element

One way to represent a user interface element in software is to store it in the form of a hierarchical tree having various nodes. FIG. 1 shows an exemplary hierarchical representation 100 of a user interface element. The nodes 110 and 120 are shown as having a parent-child relationship. For example, the node 110 is a parent element of the child element 120. Because the representation 100 includes more than one node, it is sometimes said to represent a "composite" user interface element. In the case of a composite user interface element, the node 110 may correspond to one visual presentation, and the node 120 may correspond to another visual presentation. However, at least one of the nodes 110 or 120 may have no visual depiction.

One or more nodes in the representation 100 may be designated as selectively exposable. In the example, the node 120 is so designated. When presenting a simplified view of the representation 100, the selectively exposable node 120 is unexposed. As a result, only the root node 110 of the nodes representing the user interface element hierarchical representation 100 is exposed. Thus, the exposed node 110 is sometimes called the "principal" node.

Much more complex user interfaces comprising multiple elements can be represented in the manner shown in FIG. 1. Each of the elements can themselves comprise other user interface elements adding additional layers of complexity (e.g., more nodes, including selectively exposable nodes) not depicted in FIG. 1. Furthermore, various child nodes may be principal nodes for representations of other user interface elements.

Figure 2:
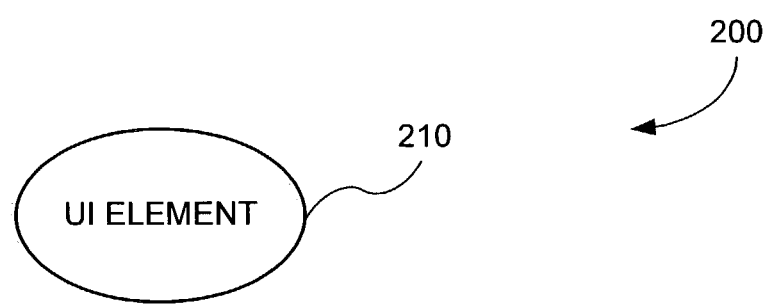
FIG. 2 is a depiction of an exemplary simplified view of the user interface element representation of FIG. 1.

FIG. 1 shows a full view of the hierarchical representation of the user interface element, including selectively exposable child nodes (e.g., the node 120). However, the full view of the hierarchical representation 100 may not be desirable when performing various operations for the representation of the user interface element. For example, direct interaction with the node 120 may be unnecessary in certain circumstances. If so, an exemplary simplified view 200 of the representation as shown in FIG. 2 can be presented.

The exemplary simplified view 200 shows only one node 210. The node 210 can be either a combined representation of the nodes 110 and 120 of the full view (e.g., where the node 120 is encapsulated within the node 110) or simply a representation of the node 110 of the full view.

Another Exemplary Hierarchical Representation of a User Interface Element

Figure 3:
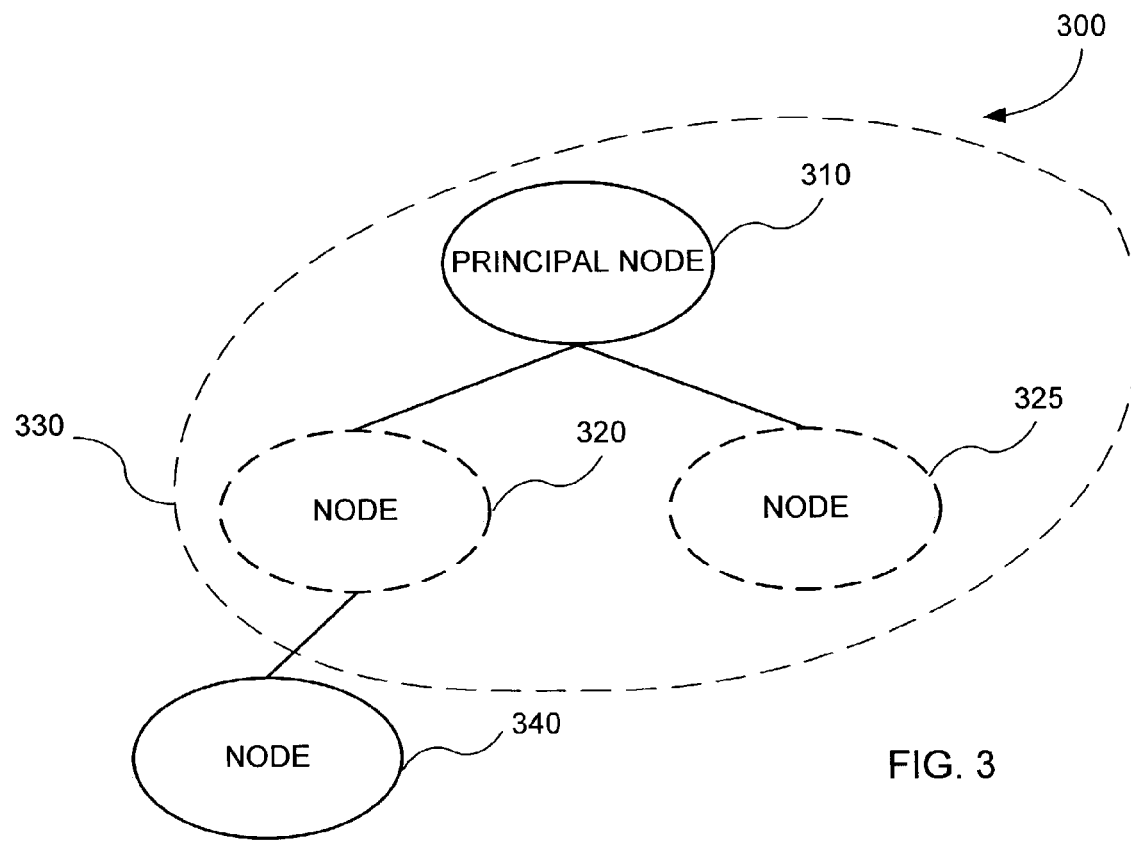
FIG. 3 is a depiction of representation of another exemplary user interface element having a simplified view.

Another exemplary hierarchical representation 300 is shown in FIG. 3. In the example, the nodes 310, 320, and 325 are a set of nodes 330 representing a composite user interface element. Out of the set of nodes 330, the node 310 is the principal node, and the remaining nodes 320 and 325 are defined as selectively exposable. Another node 340 is not selectively exposable and is shown as a child of one of the selectively exposable nodes 320. The representation 300 includes the selectively exposable nodes and is provided if a full view is requested.

Figure 4:
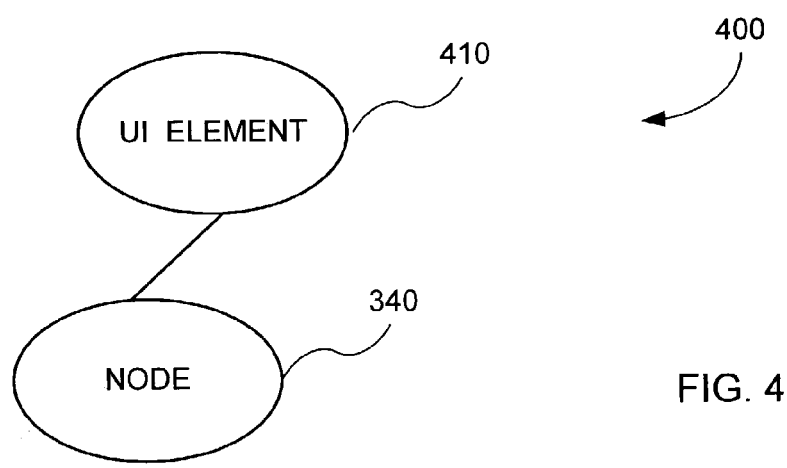
FIG. 4 is a depiction of an exemplary simplified view of the user interface element representation of FIG. 3.

A corresponding simplified view is shown in FIG. 4. The selectively exposable nodes 320 and 325 are not exposed when a simplified view is requested. Instead, the simplified view 400 shows the node 410 (e.g., the node 310 or a combination of the nodes 310, 320, and 325) and the node 340.

Referring now to FIG. 3, one of the nodes 320 can be designated as the node under which simplified view children (e.g., the node 340) are stored. Such a node is sometimes called a "container" node (e.g., for the encapsulated nodes).

A relatively complex representation of a user interface can thus be presented in simplified form is desired. A full view 300 of a hierarchical representation of such a complex user interface may not need to be provided for a program written by a user who has no interest in the selectively exposable nodes in the hierarchical representation. For example, a programmer may not be interested in the existence of or defining the functionality or appearance of the user interface elements relating to the selectively exposable nodes 320 and 325. However, the program may need to interact with the node 340. Thus it is sometimes desirable to provide the simplified view 400 of the hierarchical representation of the user interface depicting only the nodes of interest.

The technologies described herein can be applied to a variety of other representations having additional or fewer nodes.

Overview of an Exemplary Simplified View Implementation

Figure 5:
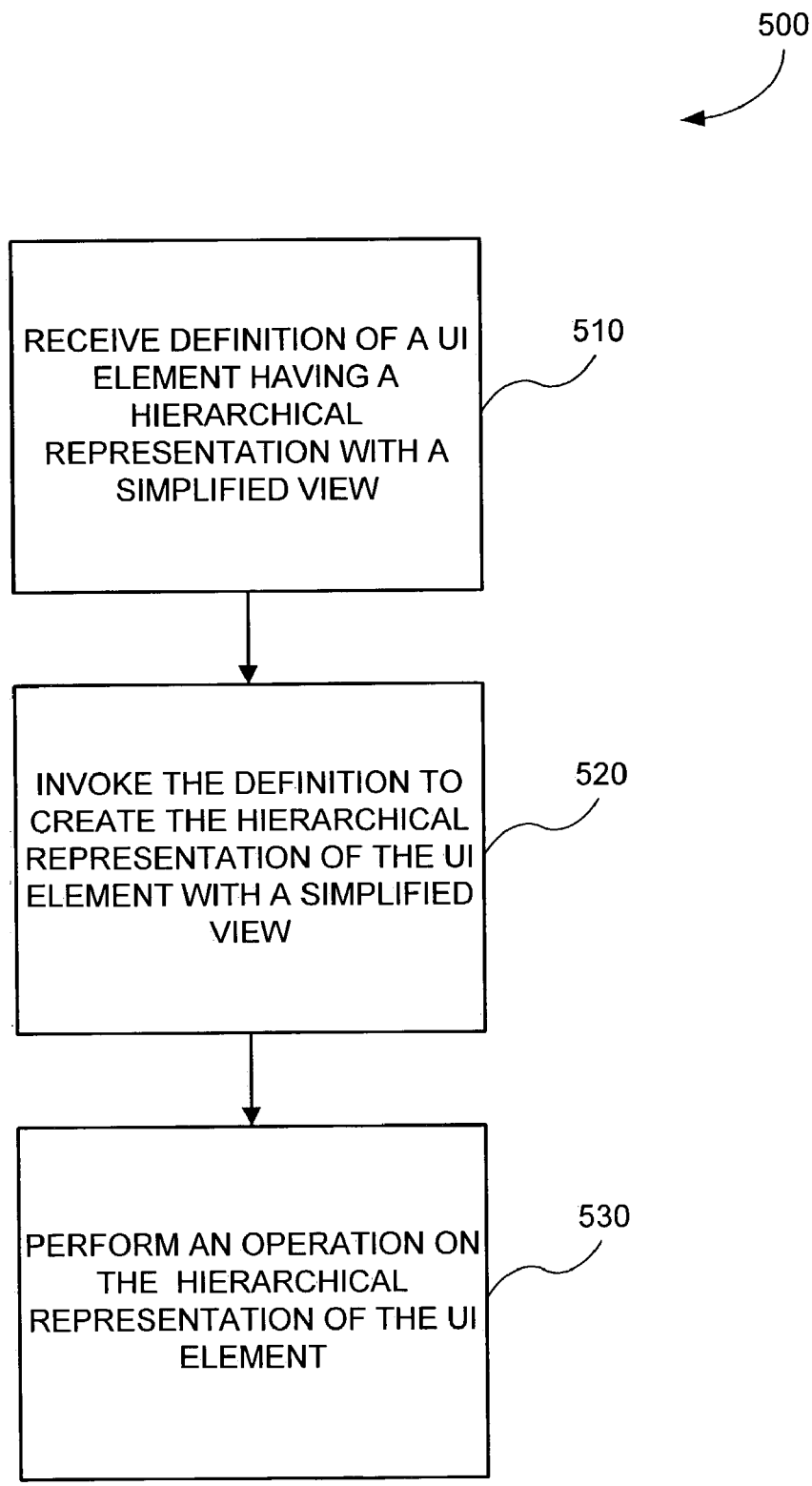
FIG. 5 is a flowchart of an exemplary method for implementing a simplified view of representation of a user interface element.

FIG. 5 shows an exemplary method 500 for implementing a simplified view of a representation of a user interface element (e.g., in a user interface service). At 510, a user interface element having a hierarchical representation is defined. For example, the definition can include a plurality of nodes, some of which are selectively exposable.

After the definition is created, it can be invoked at 520 to create the user interface. For example, a hierarchical representation of the defined user interface element can be created via the definition and stored.

One or more operations can be performed on the representation at 530. Such operations can be performed via the simplified view of the hierarchical representation without exposing the selectively exposable nodes in the representation.

If desired, invocation of the definition and performing operations on the representation can be done without reference to the full view of the representation. Thus, programmers can write code or markup with out having to acquaint themselves with the details of the full view. In practice, any one of the pictured actions can be independently useful and need not be performed all at once or by the same program.

Figure 6:
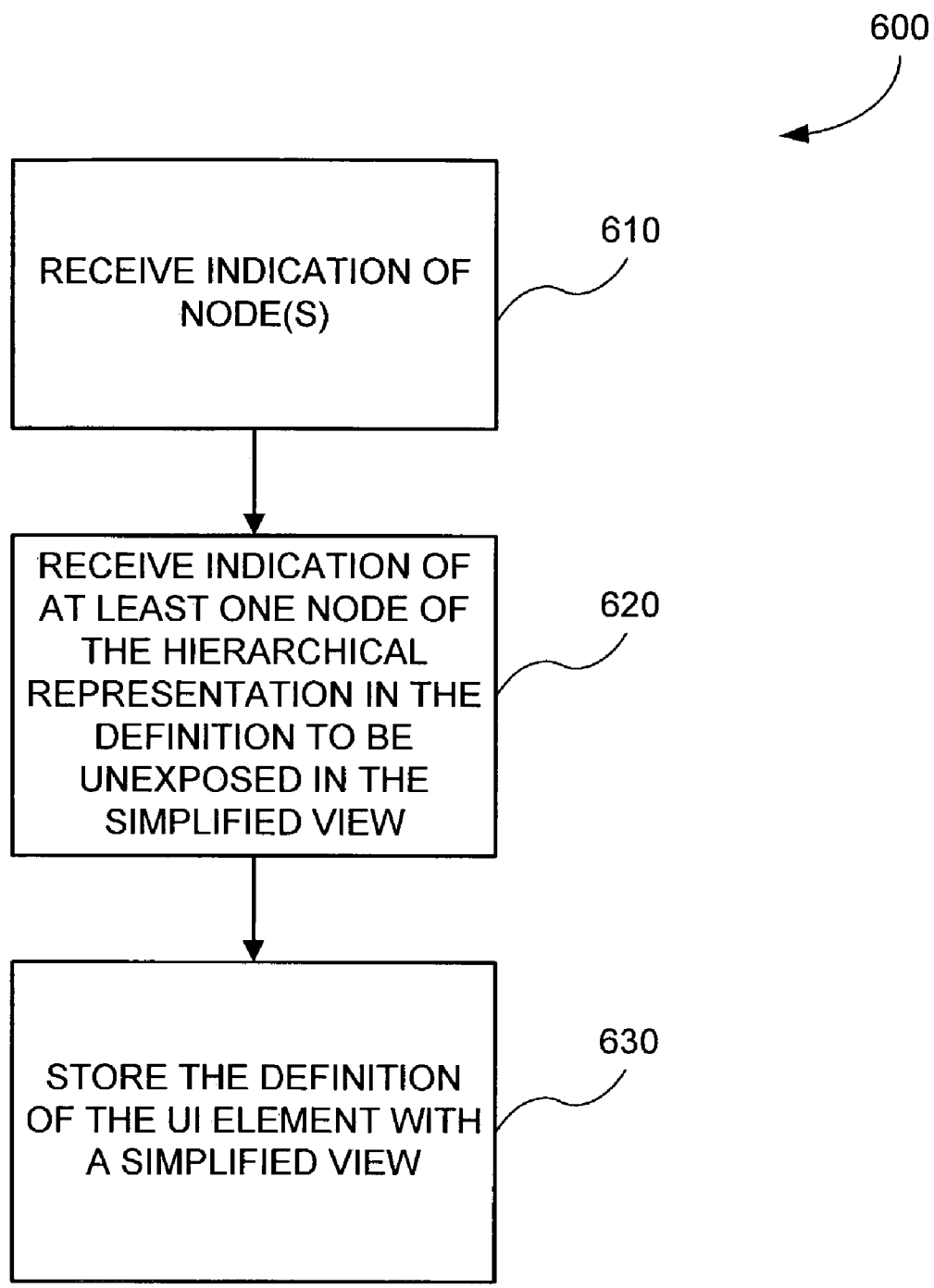
FIG. 6 is a flowchart of an exemplary method for processing a definition of a user interface element having a representation with a simplified view.

Exemplary Method for Defining a User Interface Element Having a Simplified View FIG. 6 shows an exemplary method for receiving a definition of a user interface element having a hierarchical representation with a simplified view. The definition may be created using various languages such as markup language (e.g. XML or HTML) or programming languages (e.g. Java or C++). Thus, the definition can be received from a program or specified in a markup document.

At 610, an indication of the one or more nodes that will be stored for the representation of the user interface element is received. For example, user interface elements (e.g., sub-elements) can be specified. The definition can indicate the hierarchical relationships between elements. Such a definition may include node definitions for various elements forming a composite user interface element.

At 620, an indication of at least one selectively exposable node is received. If desired, the selectively exposable nodes could be chosen automatically instead of specified in the definition. When a simplified view of a representation of the defined user interface element is provided, the selectively exposable nodes are unexposed. The definition can then be stored at 630 for later invocation.

Figure 7:
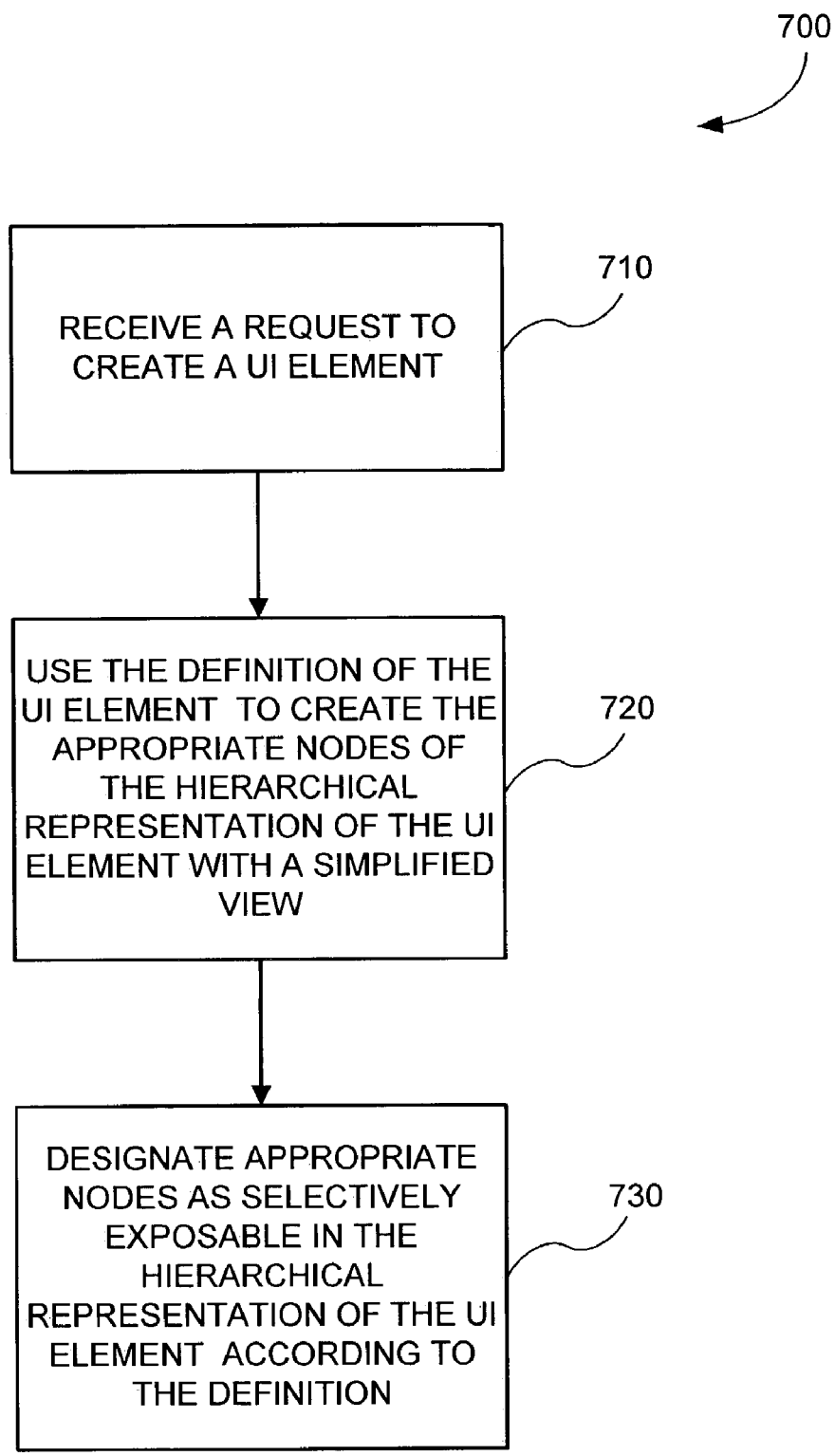
FIG. 7 is a flowchart of an exemplary method for invoking a definition of a user interface element having a simplified view, such as that processed in FIG. 6.

Exemplary Method for Invoking a Defined User Interface Element Having a Simplified View An instance of the user interface element can be created by invoking the definition (e.g., such as that defined via the method shown in FIG. 6). FIG. 7 shows an exemplary method for invoking a definition of a user interface element having a simplified view. At 710, a request to create a user interface element is received. Such a request can be received programmatically (e.g., from a software program) or from a markup document. The request need not be received from the same entity that defined the user interface element.

At 720, the definition of the hierarchical representation of a user interface element is used to create the appropriate nodes in the hierarchical representation of the user interface (e.g., corresponding to the user interface elements forming a composite user interface element). The created nodes are provided if a full view of the representation is requested.

At 730, the appropriate nodes (e.g., as specified by the definition) are designated as selectively exposable. Such selectively exposable nodes are not exposed (e.g., are not encountered) when a simplified view (e.g., of the representation in which the user interface element is represented) is requested.

Whether a node is exposed in a view of the representation of a user interface element is independent of whether or not the corresponding user interface element is displayed (e.g., is hidden) on a display device when the user interface element is rendered.

Exemplary Method for Performing an Operation on a User Interface Element Having a Simplified View Once the definition of the user interface is invoked to create the hierarchical representation of the user interface element (e.g., as shown in FIG. 7), operations can be performed for the representation. Such operation may be performed for either the full or the simplified view of the representation. The operations performed on the simplified view include, for example, enumerating children of a node, adding children to a node, removing children of a node, and navigating within the hierarchical representation.

Figure 8:
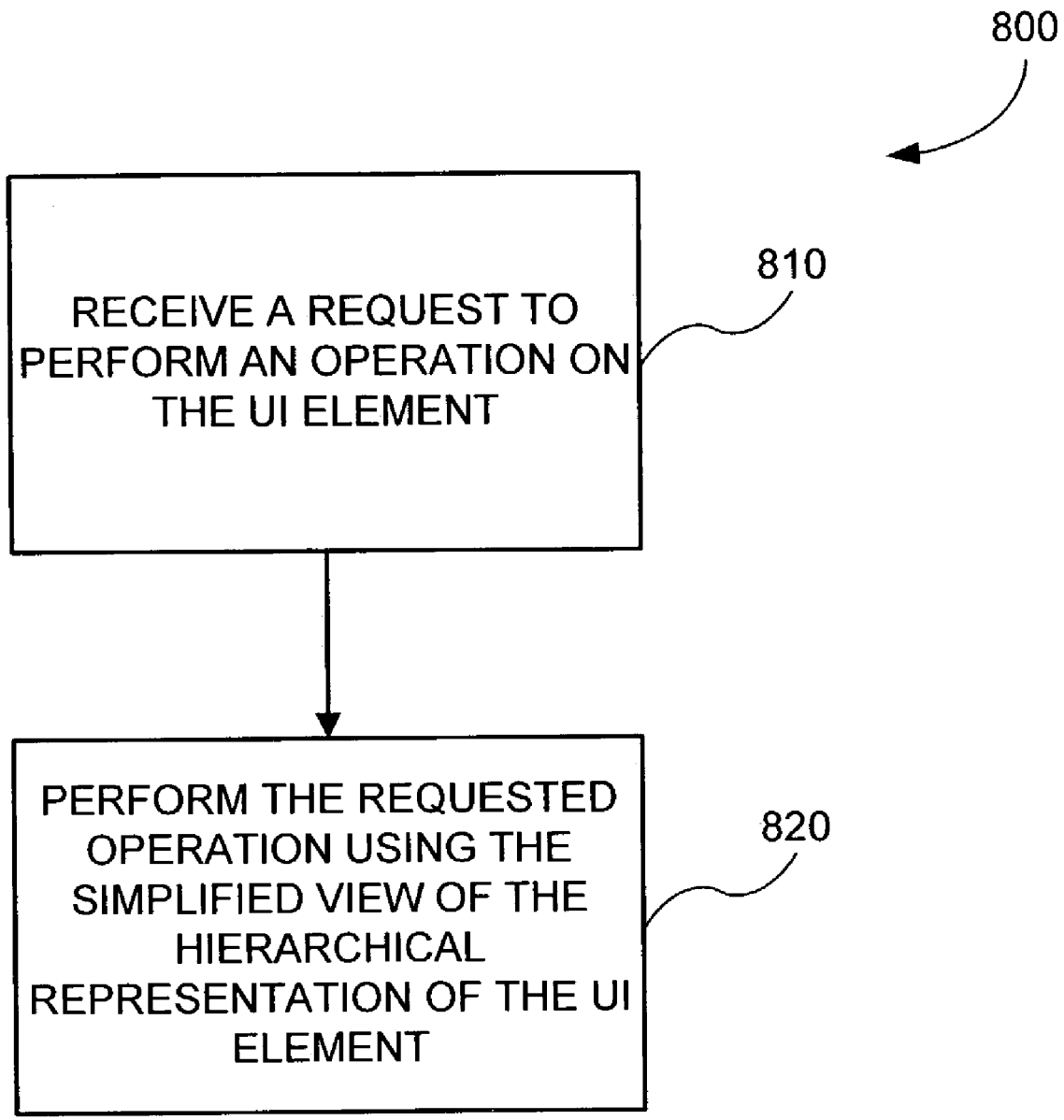
FIG. 8 is a flowchart of an exemplary method for performing an operation on a hierarchical representation of a user interface element, such as that created in FIG. 7.

An exemplary method for performing an operation on a simplified view of a representation of a user interface element is shown in FIG. 8. At 810, a request to perform an operation on the user interface element (e.g., the principal node of a composite user interface element) is received. At 820, the requested operation is performed using the simplified view of the hierarchical representation of the user interface element. The operation may result in a modification of the hierarchical representation (e.g., when adding or removing nodes), or the representation may not be changed (e.g., when enumerating or navigating within nodes).

For example, a request to enumerate children of a node using the simplified view can result in enumeration of the children stored in a child node (or a grandchild node) of the node, if the child node is designated as selectively exposable.

A request to add a child to a parent node having selectively exposable children in the simplified view can result in the child being added to its appropriate place in the hierarchy of the full view of the representation of the user element which may or may not be the parent node visible in the simplified view.

Thus, in the simplified view it will seem as though a child was added directly beneath the parent node. For operations involving children, the definition of the hierarchical representation of the user interface element can be used to find the appropriate place to add or find children within the full view of hierarchical representation. In this way, a program can be written to interact with the simplified view, and the programmer is shielded from the trouble of having to know the details of the full view including the hidden nodes and their arrangement within the hierarchy.

Exemplary Implementations Relating to a Combo Box

Some of the following examples describe various processing related to an exemplary user interface element known as a combo box. The techniques described can be applied to any number of user interface elements now in existence or hereafter developed.

Exemplary Combo Box User Interface Element

Figure 9:
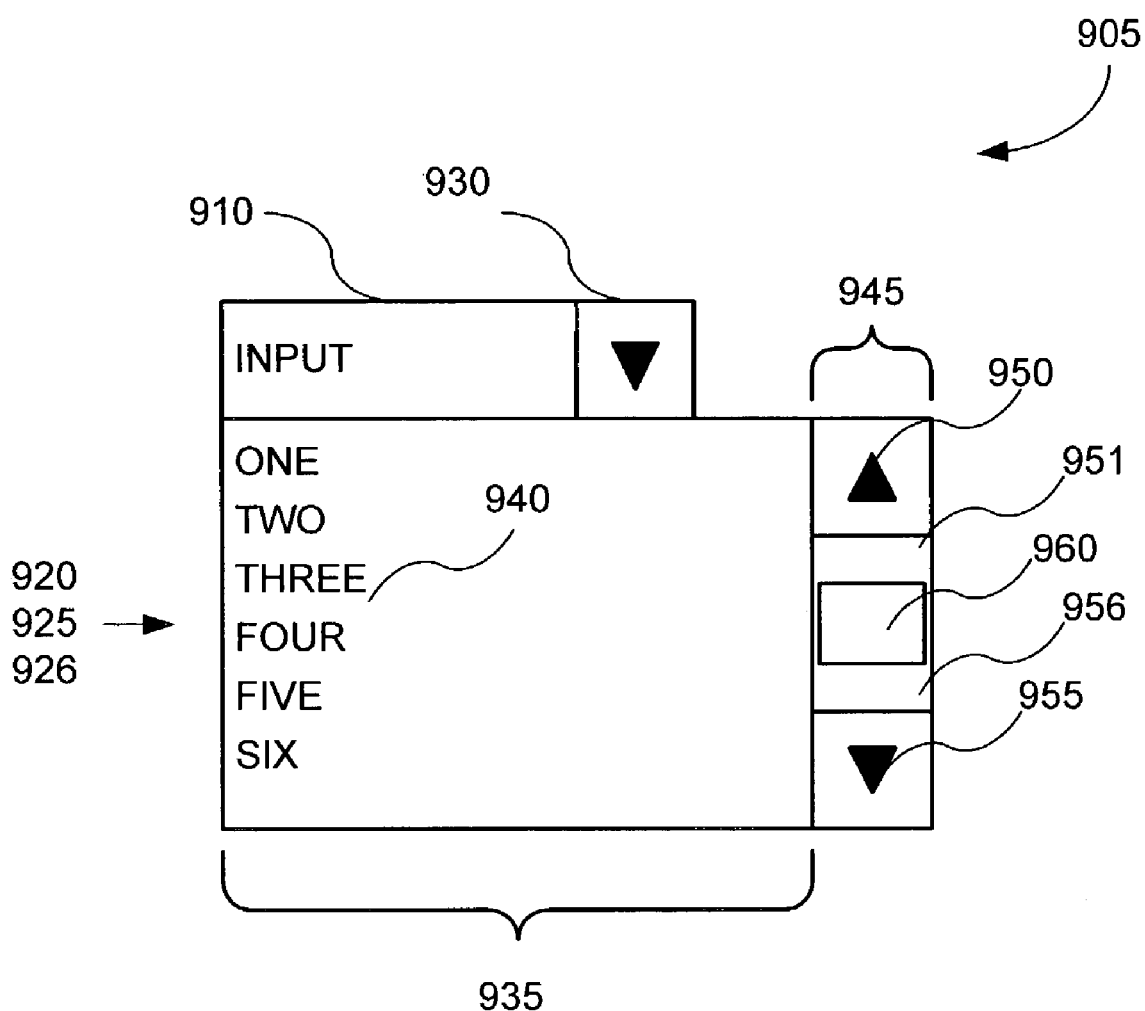
FIG. 9 is a screen shot of an exemplary user interface element referred to as a combo box.

FIG. 9 shows an exemplary user interface element 905 commonly known as a combo box. In the example, the combo box 905 is a composite user interface element comprising several user interface elements, which in turn comprise further user interface elements. The combo box 905 comprises an input box 910, a drop down button 930, and a pop up window 920. Generally, when a user clicks on the drop down button 930 the pop window 920 is displayed. In this example, the pop up window 920 contains a list box 925 (e.g., visually indistinguishable from the pop up window 920). However, the pop up window 920 may contain alternative or additional user interface elements (e.g., a drop down menu). The list box 925 is also a composite user interface element with its own elements, such as the scroll viewer 926 (e.g., also visually indistinguishable from the pop up window 920) containing the grid panel 935 and the scrollbar 945 for scrolling through the list items 940, which are contained within the grid panel 935.

In the exemplary illustration of the combo box 905, the list box element 925 is depicted as visually indistinguishable from the scroll viewer element 926 and the pop up element 920. Thus, the illustration shows that the pop up window 920 contains the list box element 925 which is formed by adding a grid panel 935 to an empty place holder contained within the scroll viewer 926. Other arrangements are possible. For example, it is possible for a pop window 920 to contain user elements other than a list box 925. Furthermore, it is also possible for the scroll viewer 926 to have elements (e.g. a menu) other than a grid panel 935 contained within its empty place holder.

The scrollbar 945 can also be represented as a composite user interface element containing elements such as the scroll buttons 950, 951, 955, and 956 and a scroll thumb 960. Any number of variations can be used instead of the pictured combo box 905. For example, elements can be removed, additional elements can be added, or alternative elements can be defined. For example, a horizontal scroll bar (not shown) may also be added to aid the user in scrolling through list items that are horizontally long.

Exemplary Representation of a Combo Box User Interface Element (Full View)

FIG. 10A depicts an exemplary hierarchical representation 1000 of a combo box (e.g., that shown in FIG. 9) to be provided (e.g., by a user interface service) when a full view is requested. As shown, the nodes are arranged in a tree structure in hierarchical fashion.

The principal node for the combo box is represented at 1005 as the top most node of the hierarchy. The other elements of the combo box (e.g., such as those shown in FIG. 9) are also represented as nodes within the hierarchical representation as the pop up 1020, the input box 1010, and the drop down button 1030. The pop up 1020 is shown as comprising the list box 1025. The list box 1025 is a parent node of the hierarchical representation which further comprises a scroll viewer 1026.

The scroll viewer 1026 is itself a parent node within the hierarchical representation. The scroll viewer node 1026 is a parent node to a place holder element 1035, the vertical scroll bar 1030 and the horizontal scroll bar 1040. As noted above in relation to FIG. 9, there is no visual difference between the parent list box node 1025 and its child element the scroll viewer 1026. This is so because the list box 1025 is formed by adding the grid panel element 1045 as a child node of the place holder element node 1035. However, other child nodes can be added under the place holder elements for using the scroll viewer 1026 in combination with other user elements to form other more complex user interface elements. Finally, the list items 1050A, 1050B, and 1050C are children of the grid panel 1045.

The example illustrates how a composite user interface element can be constructed from other user interface elements and thus be represented by many nodes. For example, a list box composite user interface element can be defined as the list box node 1025 and its descendant nodes. To construct a combo box composite user interface element, the input node 1010, the popup node 1020, and the button node 1030 can be combined under the combo box node 1005. Finally, the list box composite user interface element (e.g., the list box node 1020 and its descendants) can be inserted (e.g., via mark up or programmatically) underneath the popup node 1020. A simple reference to the list box composite user interface element can result in creation of the list box node 1025 and its descendants. In practice, the nodes related to list items (e.g., the nodes 1050A, 1050B, and 1050C) might not be included in the definition of the list box user interface element.

The multiple nesting of nodes shown in the example can add to the complexity of defining and manipulating a user interface element. Although the combo box representation is relatively complex, even more complex examples can be implemented. However, the technologies can also be applied to more simple examples.

In the example, the set of nodes 1060 comprising nodes 1010, 1020, 1025, 1026, 1030, 1031A, 1031B, 1033, 1034A, 1034, 1035, 1040, 1041A, 1041B, 1043, 1044A, 1044B, and 1045 have been defined as selectively exposable. When a simplified view of the representation is presented, the selectively exposable nodes are not exposed.

A simplified view of the hierarchical representation of the user interface element may be desired. For example, it may be desirable to add additional list items without having to deal with the relative complexities of the hierarchical representation (e.g., where to add the list items as children).

Exemplary Representation of a Combo Box User Interface Element (Simplified View)

Although a composite user interface element can include a complex plurality of nodes, it may be desirable to provide a simplified view of the hierarchical representation of the user interface element. FIG. 11 shows an exemplary hierarchical representation 1100 (e.g., corresponding to the representation 1000 of FIG. 10A) provided when a simplified view of a combo box (e.g., such as that of FIG. 9) is requested. In the example, the nodes 1050A, 1050B, and 1050C for the list items are shown as the direct children of the principal node 1105 of the combo box. The other nodes not shown are sometimes said to be "encapsulated by" the combo box node 1105. Using the simplified view, a program concerned with manipulating the list items can regard the list items as children of the principal node 1110 and need not contain logic concerning the other elements in the composite user interface element. The definition of the combo box user interface element can contain sufficient information by which operations for the simplified view can be translated into appropriate operations for the full view of the hierarchical representation.

Exemplary Nesting of User Interface Elements Having a Simplified View

The arrangements described herein can also support nesting. In nesting, there may be user interface elements having selectively exposable nodes within other user interface elements, which themselves have selectively exposable nodes. Such nesting can be resolved in a variety of ways. For example, although some of the nodes in a composite user interface element may be designated as exposed (e.g., viewable in a simplified view), if the user interface element is made part of (e.g., encapsulated within) another composite user interface element, such nodes may be considered selectively exposable (e.g., not visible in a simplified view) by virtue of the fact that they are within a region of the hierarchy representing the encapsulating composite user interface element that is designated as selectively exposable (e.g., by the encapsulating composite user interface element).

Further, such nesting can support relativity. For example, nodes may or may not be considered selectively exposable depending upon the node on which a request to perform an operation is made. In other words, a request to perform an operation on a node encapsulated within another user interface element may result in a view that shows nodes not seen when performing an operation on the encapsulating user interface element.

Figure 10B:
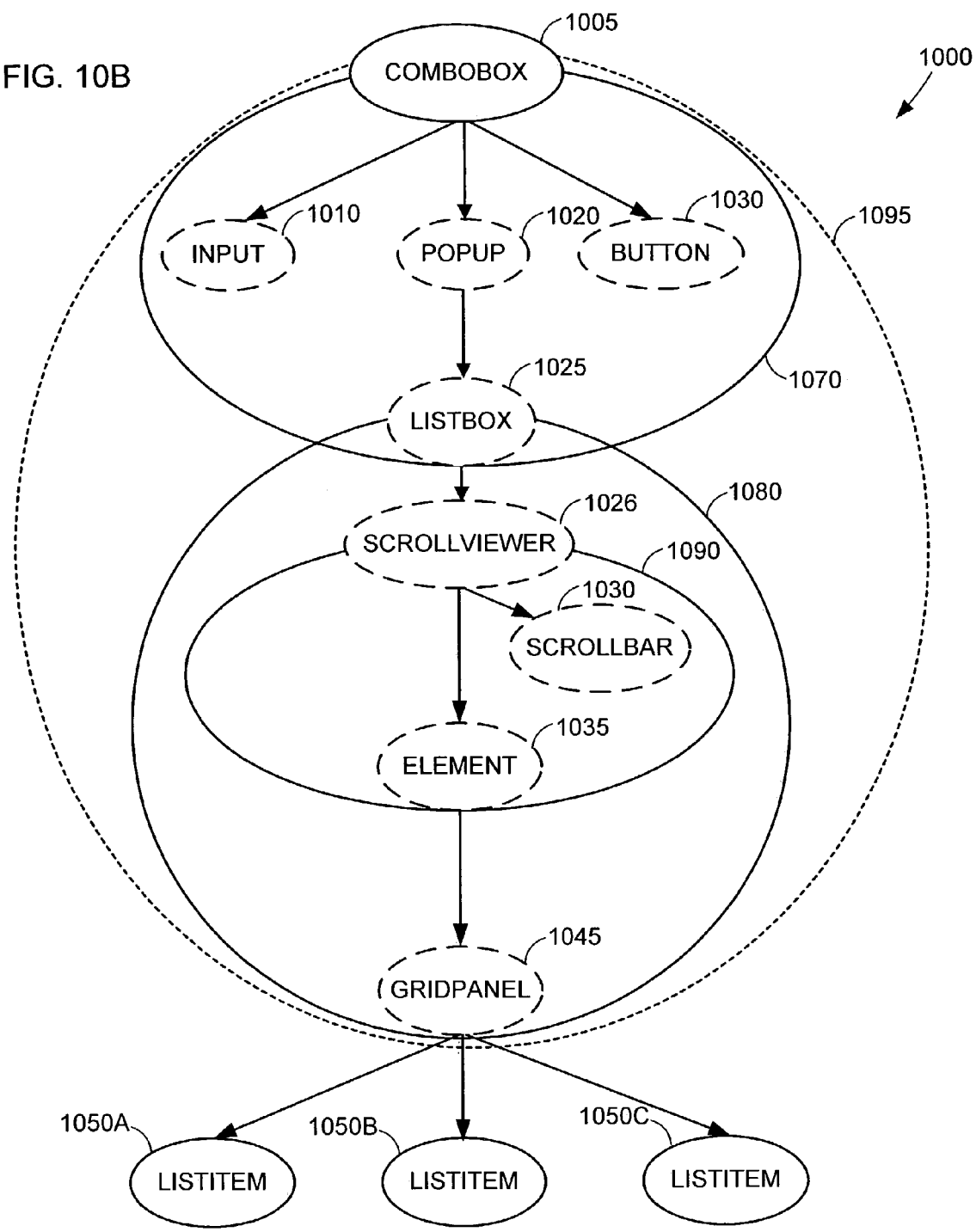
FIG. 10B is a depiction of an exemplary hierarchical representation of a combo box similar to that of FIG. 10 and includes exemplary encapsulation boundaries.
Figure 11:
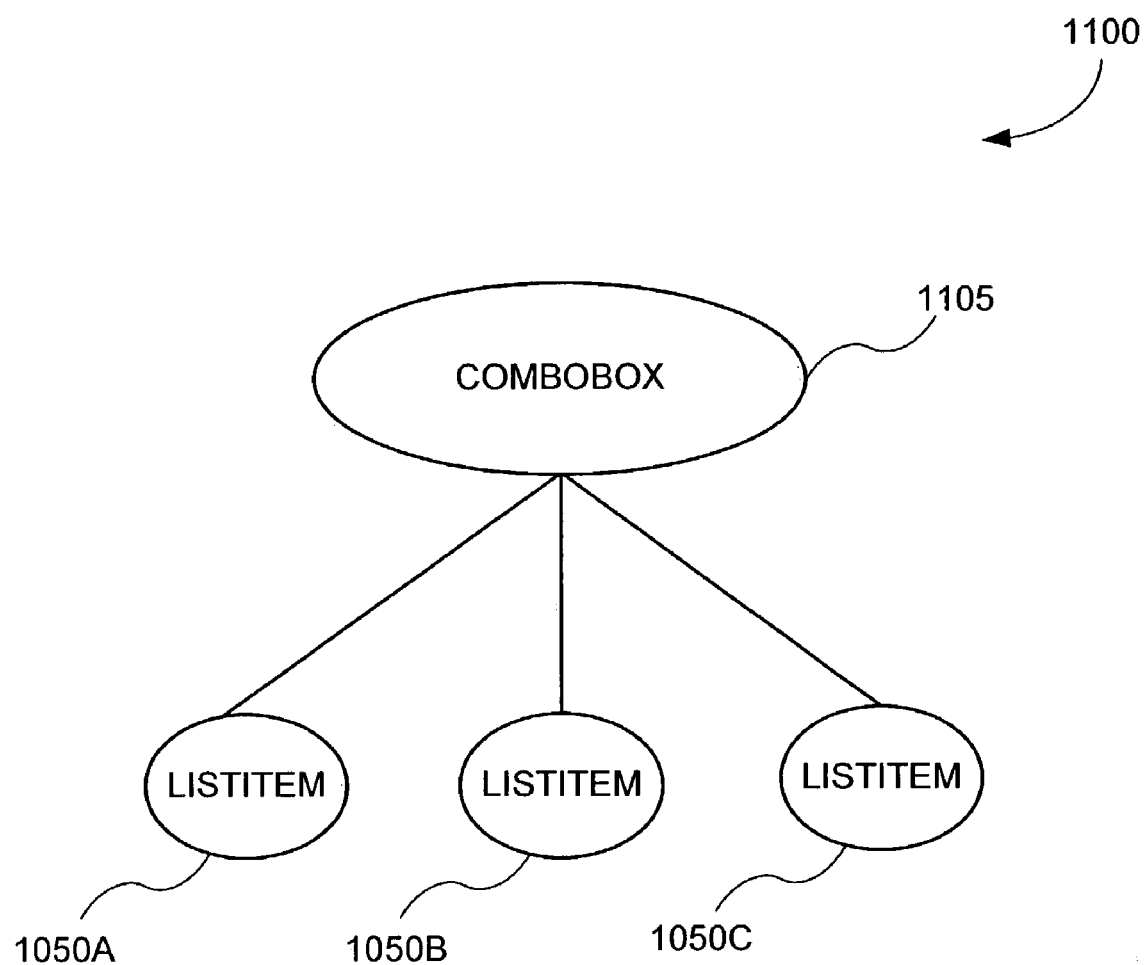
FIG. 11 is a depiction of an exemplary simplified view of a hierarchical representation of a combo box, such as that shown in FIG. 10.

FIG. 10B shows an exemplary hierarchical representation of a combo box, such as that represented in FIG. 10A. For the sake of brevity, some of the nodes related to scroll bars are omitted.

In the example, a scroll viewer node 1026 is the principal node of a composite user interface element comprising the scroll viewer node 1026, the container element node 1035, and the various scrollbar nodes (e.g., the node 1030). For operations performed on the scroll viewer node 1026 in a simplified view, the other nodes of the composite user interface element are considered to be selectively exposable (e.g., are skipped) and encapsulated by the scroll viewer node 1026. For example, a request to add a child node to the scroll viewer node 1026 in a simplified view would result in a child node being added to the container element node 1035. In this way, an encapsulation boundary 1090 is defined.

Similarly, the list box node 1025 is the principal node of a composite user interface element comprising the scroll viewer node 1026 (e.g., and the nodes encapsulated thereby) and the grid panel 1045. For operations performed on the list box node 1025, the other nodes of the composite user interface element are considered to be selectively exposable (e.g., are skipped) and encapsulated by the list box node 1025. In this way, an encapsulation boundary 1080 is defined.

Further, the combo box node 1005 is the principal node of a composite user interface comprising an input node 1010, a pop up node, 1020, a button node 1030, and the list box node 1025 (e.g., and the nodes encapsulated thereby). For operations performed on the combo box node 1005, the other nodes of the composite user interface element are considered to be selectively exposable (e.g., are skipped) and encapsulated by the combo box node 1005. In this way, an encapsulation boundary 1070 is defined. Because the list box node 1025 is itself part of an encapsulation boundary, the effective encapsulation boundary 1095 takes effect. In other words, for operations performed on the combo box node 1005, the nodes shown except the combo box node 1005 and the list item nodes 1050A-C are considered to be selectively exposable (e.g., are skipped) and encapsulated by the combo box 1005. For example, a request to add a child node to the combo box node 1005 in a simplified view would result in a child node being added to the grid panel node 1045.

Exemplary Method for Representing a User Interface Element Having a Simplified View A variety of methods can be used to provide a simplified view. One such method is to store within the representation of the user interface element various properties for the nodes. The following example describes using properties (e.g., "Encapsulating Parent" and "Encapsulating Container") to designate which nodes in a representation are selectively exposable.

By setting a node's appropriate property (e.g., "Encapsulating Parent") to TRUE, nodes below the node in the hierarchy are designated as selectively exposable (e.g., not exposed in the simplified view).

As described herein, such a node is sometimes called the "principal" node. Further, if a particular node below the principal node in the hierarchy has an appropriate property (e.g., "Encapsulating Container") set to TRUE, children of the particular node are designated as not selectively exposable (e.g., are exposed in the simplified view). In such a case, children of the particular node are considered to be the children of the principal node for purposes of the simplified view. So, if children are added to the principal node via the simplified view, they are actually added as children of the particular node having the property (e.g., "Encapsulating Container") set to TRUE.

Nesting can be supported as described with respect to FIG. 10B. In the example, a node at the top of an encapsulation boundary (e.g., a principal node) can have an appropriate property (e.g., the "Encapsulating Parent" property) set, and a node at the bottom of the encapsulation boundary can have an appropriate property (e.g., the "Encapsulating Container" property) set. In this way, encapsulation boundaries can be defined via property setting.

Figure 12:
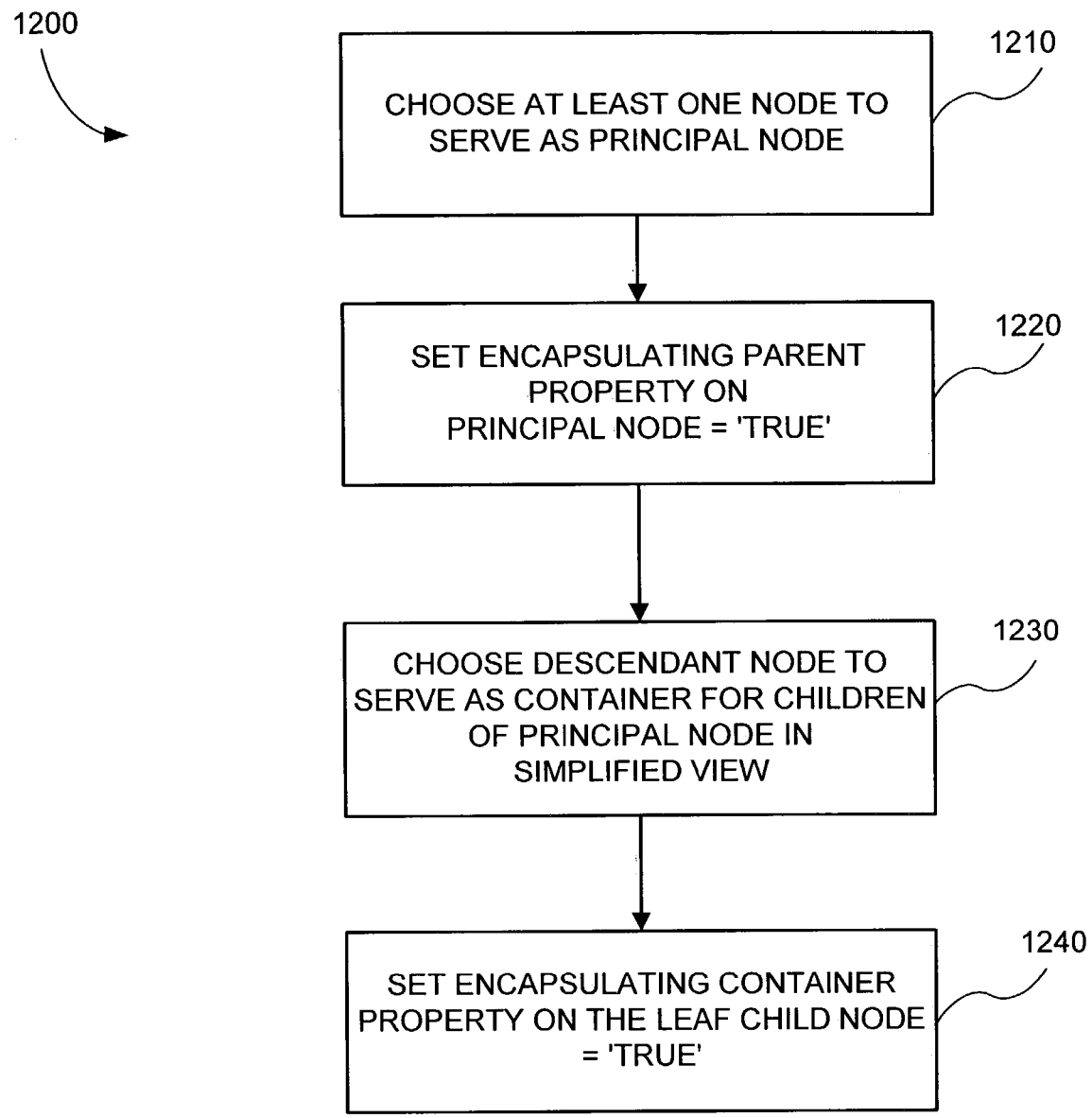
FIG. 12 is a flowchart of an exemplary method for creating the hierarchical representation of a user interface element having selectively exposable nodes.

FIG. 12 shows an exemplary method 1200 for representing a user interface element with a simplified view via denoting values of various properties of nodes within a hierarchical representation of the user interface element. The nodes of the hierarchical representation can have properties related to selectively exposing the node itself, its children, or its parents. By setting such properties, a user interface element having a simplified view can be represented, and operations can be performed on the representation via the simplified view.

At 1210 at least one node of the hierarchical representation of the user interface is chosen to serve as a principal node (e.g., that encapsulates the selectively unexposed nodes). At 1220 the IsEncapsulatingParent property on the chosen node is set to 'TRUE'. At 1230, a descendant of the principal node is chosen to serve as a container for any children (e.g., now present or subsequently added) of the principal node in the simplified view. Then at 1240, the IsEncapsulatingContainer property of the descendant node is set to 'TRUE.'

By setting the properties as explained in the example, the container and any intermediate descendants (e.g., children) between the principal node and the container are thereby defined as selectively exposable (e.g., skipped the simplified view or "encapsulated" within the parent). Child nodes underneath the container will be exposed (e.g., visible) in the simplified view.

In some arrangements, there may not yet be any child elements. In such a case, the appropriate property of a leaf node can be set. Subsequently, when children are added via the simplified view, they are placed underneath the leaf node.

Exemplary Markup Definition of a Combo Box

A user interface element having a simplified view of its representation can be defined in a variety of ways. One such way is via a markup language (e.g. HTML or XML), which can be processed and stored for later invocation. FIG. 13 shows an exemplary definition of a combo box with a simplified view (e.g., such as that shown in FIG. 11) written in XML.

When an instance of the defined combo box is created, appropriate properties can be set for the various nodes of the hierarchical representation to achieve the desired simplified view. The scheme of defining the properties of the various nodes of the hierarchical representation can be adaptable to be used in other types of languages besides markup languages.

In the example, nesting is achieved. The definition of FIG. 13 can result in the arrangement shown in FIG. 10B.

Exemplary Programmatic Definition of a Combo Box

A user interface element having a simplified view can also be defined programmatically (e.g., in a programming language such as C++ or Java). For example, FIGS. 14A and 14B show a programmatic definition of the hierarchical representation of a combo box with a simplified view.

Both the mark up definition of FIG. 13 and the programmatic definition of FIGS. 14A and 14B show a combo box defined as having a pop up element containing a list box element for holding the children of the combo box exposed in the simplified view (i.e. the list items). The list box element (which is a composite control itself) is further defined as having a scroll viewer element containing a grid panel for holding the children of the list box that are exposed in the simplified view (i.e. the list items).

Again, in the programmatic definition example, nesting is achieved. The definition of FIGS. 14A and 14B can result in the arrangement shown in FIG. 10B. A composite user interface element (e.g., a combo box) is thus defined via assembly of various user interface elements, each of which can have provisions for selectively exposable nodes. When assembled in to a composite user interface element, nesting can be handled in such a way that the details of how selectively exposable nodes are defined within the encapsulated user interface elements remains transparent when operating on an outer level (e.g., encapsulating) user interface element.

Exemplary Markup Invocation of a Combo Box Definition

The definition of a user interface element (e.g., such as those shown in FIGS. 13 and 14) can be invoked to create a representation of the user interface element, including any selectively exposable nodes that remain unexposed in the simplified view. Such invocation can be achieved in a variety of ways (e.g., via markup language or programmatically).

Figure 15:
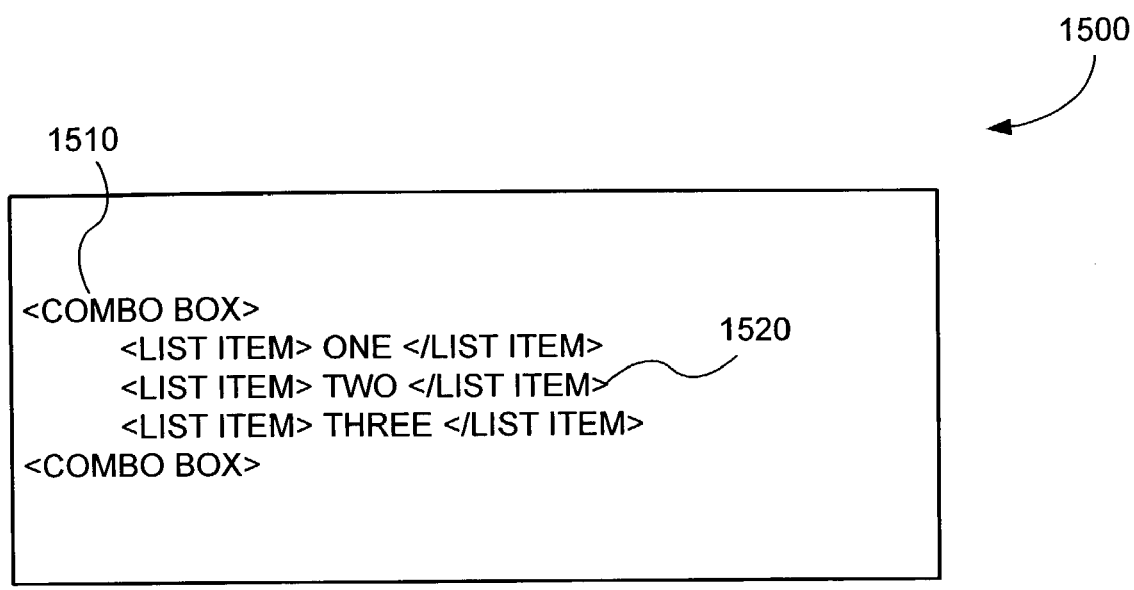
FIG. 15 is an exemplary markup invocation of a combo box, such as that defined in FIG. 13 or 14A and B.

An exemplary invocation 1500 of a definition (e.g., such as those shown in FIGS. 13 and 14) is shown in FIG. 15 as written in XML. By including the tag "<COMBO BOX>" at 1510, the invocation makes use of the previously created definition of the combo box which facilitates a simplified view of the hierarchical representation of the combo box. As shown in the example, the only other effort on the part of invocation is to specify the list items 1520 without having any knowledge of the full hierarchical representation of the combo box. The structure of the invocation in FIG. 15 can thus correspond to the simplified view of the hierarchical representation of the combo box, even though the combo box is actually composed of plural other user interface elements. In this way, the re-use of user interface elements to create composite controls is encouraged. In the example, a simplified view can be used by the system by virtue of the fact that the invocation is performed in XML.

Exemplary Programmatic Invocation of a Combo Box Definition

Figure 16:
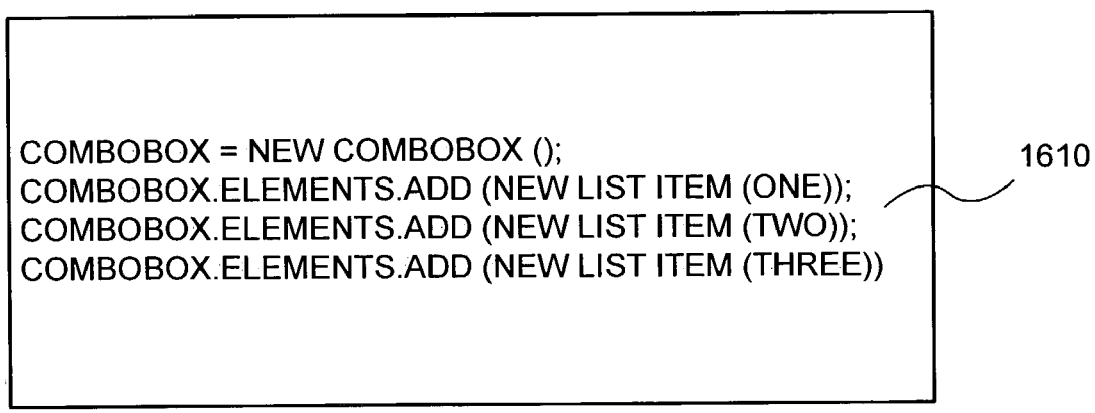
FIG. 16 is an exemplary programmatic invocation of a combo box, such as that defined in FIG. 13 or 14A and B.

Similarly, the scheme of invoking the combo box carries over to the programmatic invocation 1600 of the definition as shown in FIG. 16. The example can be implemented in a variety of programming languages (e.g., Java and C++). The line of code "COMBOBOX=NEW COMBOBOX ( )" at 1610 invokes the previously created definition. The advantages described above for the markup version also apply to the programmatic invocation. To access the full view instead of the simplified view, other language can be used (e.g., "COMBOBOX.FULLVIEW.ELEMENTS" or the like).

Exemplary Method for Performing an Operation on Simplified View

Once software or markup has invoked a defined user interface element, a hierarchical representation of the user interface element having a simplified view is created and available for operations. Operations include adding children, removing children, enumerating children, inquiring what is the parent node of a node in the simplified view, and various operations for navigating the hierarchical representation of the user interface element. The results of these operations may differ according to whether they are performed using the simplified view of the hierarchical representation or the full view.

In the various embodiments, a program can specify whether the simplified view is desired. Or, in some scenarios, it may be assumed from the context that a simplified view is desired.

With some operations, such as adding children or removing children in the simplified view, the definition of the hierarchical representation of the user interface element may be used to determine how the operations should be performed on the full view.

Figure 17:
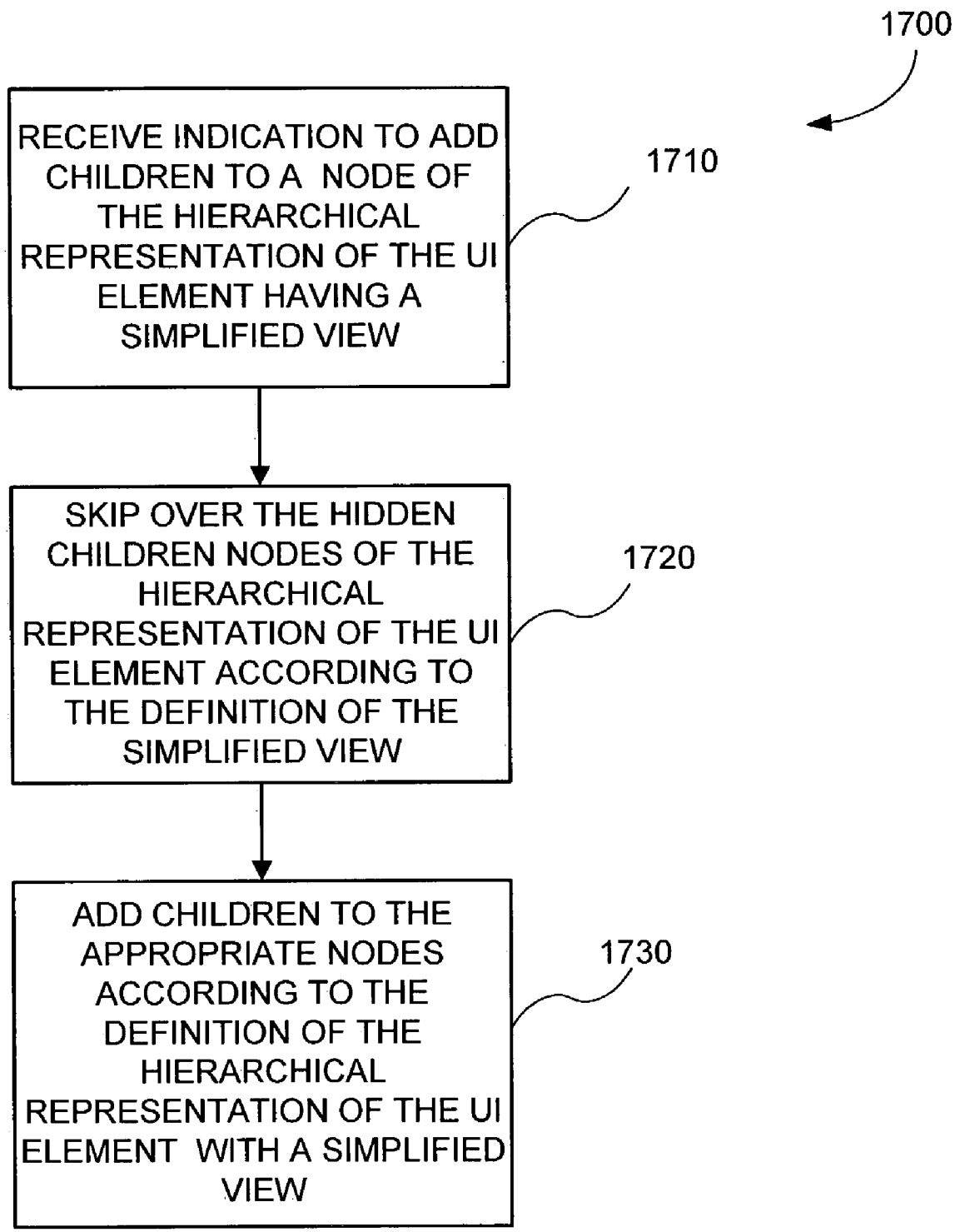
FIG. 17 is a flowchart of an exemplary method for performing an operation using the simplified view of a user interface element representation.

FIG. 17 shows an exemplary method 1700 for performing an operation on a simplified view, namely adding a child to a user interface element (e.g., a node representing such an element). At 1710, an indication to add children to a node on the simplified view of the hierarchical representation of a user interface element is received. At 1720, based on how the hierarchical representation of the user interface has been defined, selectively exposable nodes are skipped, and the new child node is added to the appropriate node according to definition (e.g., to the node having the "Encapsulating Container" property set to 'TRUE') at 1730.

Figure 18:
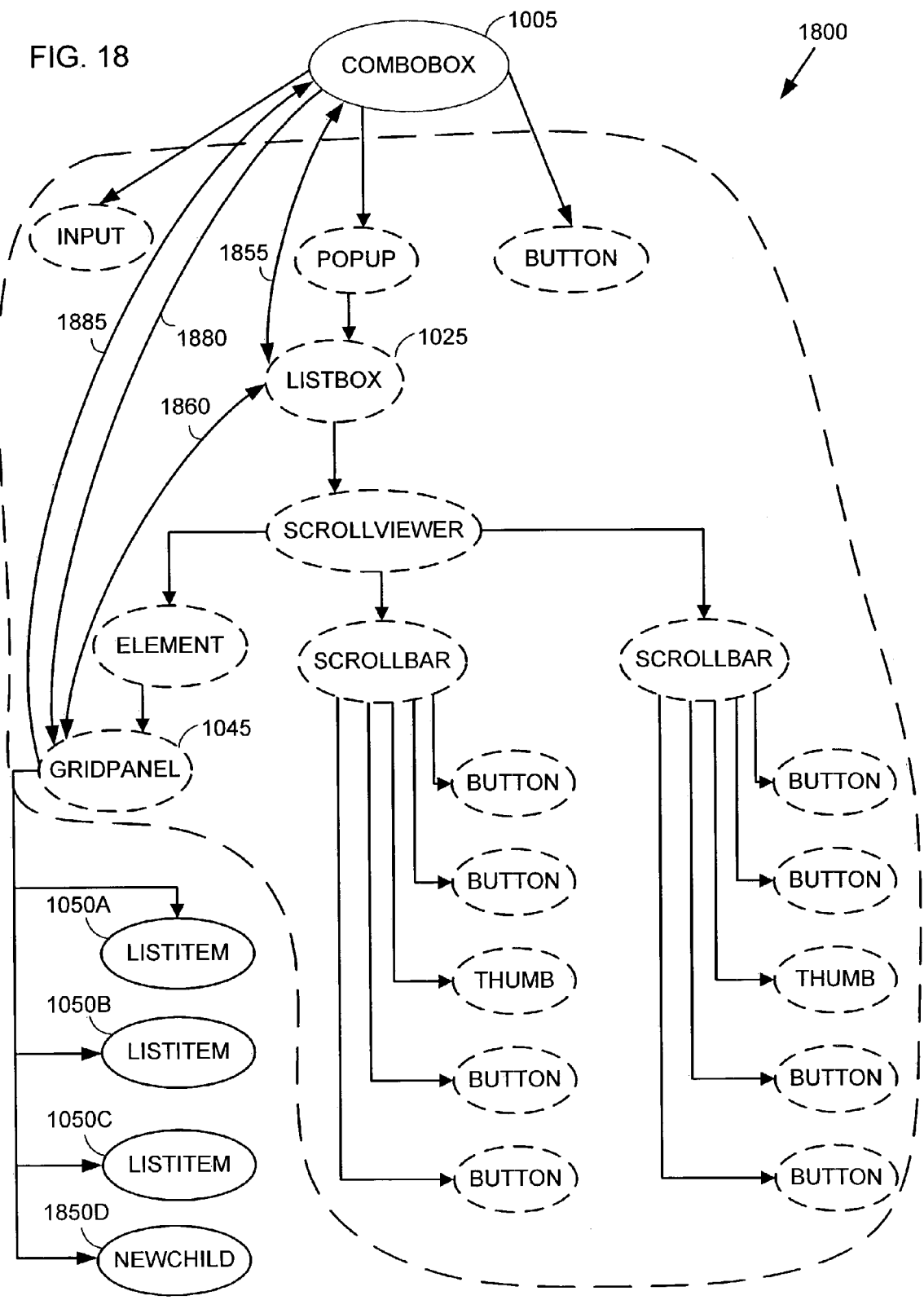
FIG. 18 is a depiction of an exemplary full view of a hierarchical representation of a combo box, such as that of FIG. 9, with appropriate nodes designated as unexposed in the simplified view, after having performed an operation via the simplified view.
Figure 19:
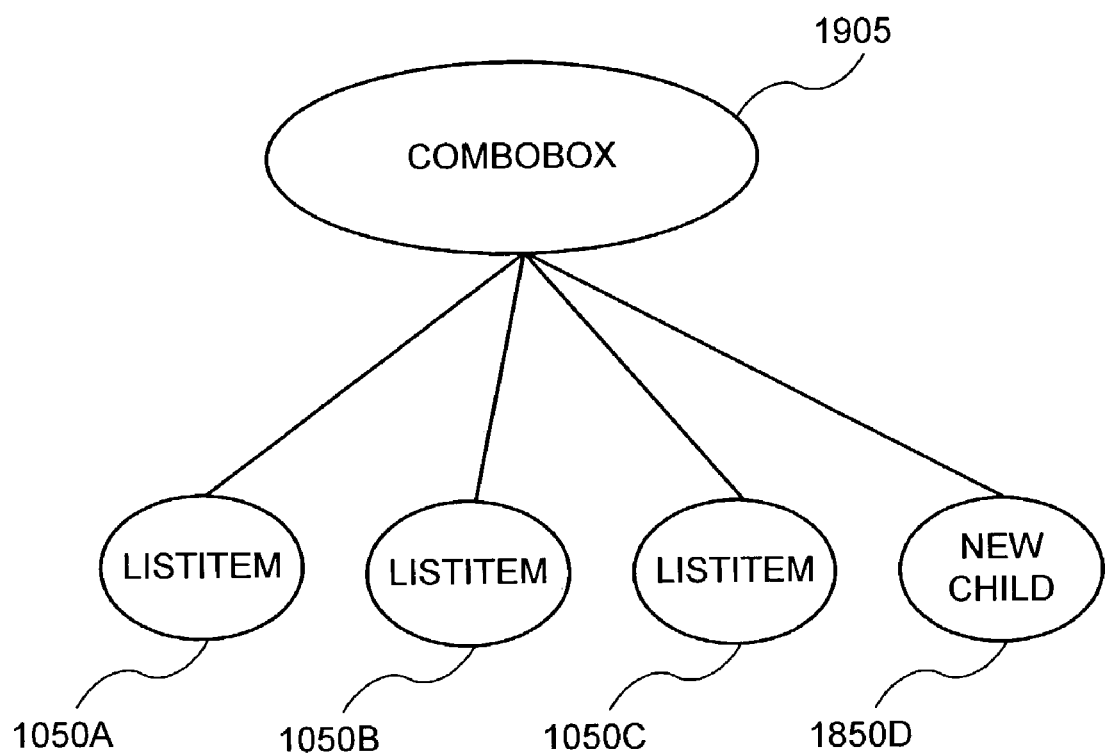
FIG. 19 is a depiction of an exemplary simplified view corresponding to the representation of FIG. 18.

The process illustrated in FIG. 17 may be used as shown in FIG. 18 to add a new child 1850 to the simplified view of the hierarchical representation of a combo box. Once the definition of the combo box is invoked, new children such as new child 1850D may be added to the simplified view of the hierarchical representation of the combo box, as shown in FIG. 19. Using the definition of the hierarchical representation, the addition of the new child 1850D in the simplified view of FIG. 19 will be translated as an addition to the appropriate place in the full view of the hierarchical representation as shown in FIG. 18.

Exemplary Details for Carrying Out the Operation

An exemplary hierarchical representation 1800 of a combo box user interface element is shown in FIG. 18. When the request to add a child to the combo box (e.g., the node 1005) is received, the "Encapsulating Parent" property is detected on the node 1005, and traversal proceeds to an associated descendant node having the "Encapsulating Container" property. In the example, traversal can be achieved via a pointer 1855. Because the "Encapsulating Parent" property is detected on the node 1025, traversal continues to proceed to an associated descendant node having the "Encapsulating Container" property. In the example, traversal can be achieved via a pointer 1860 to the node 1045. The new child is then added as a child node 1850D to the node 1045.

If desired, a direct pointer 1880 can be implemented to more directly navigate to the appropriate node where children are to be added. Additionally, a pointer 1885 back to the principal node can be included.

When a new child is added in the simplified view as shown in FIG. 19, it will seem to the invoking program as though the new child 1850D is being added as a child of the combo box principal node 1905. However, the operation is actually implemented (e.g., by the user interface service) as the addition of the new child 1850D in the full view of FIG. 18 (e.g., under the grid panel node 1045).

Nesting can be handled in a variety of ways. For example, pointers can be used as shown to skip over intermediate levels of encapsulation. Or, a level of nesting can be tracked while traversing the hierarchical representation. Based on the level, it can be determined which nodes are to be skipped. Traversal can also proceed from the bottom of the hierarchy to the top (e.g., in a request by a child node to enumerate its parent).

Alternative Representation of Selectively Exposable Nodes

Figure 20A:
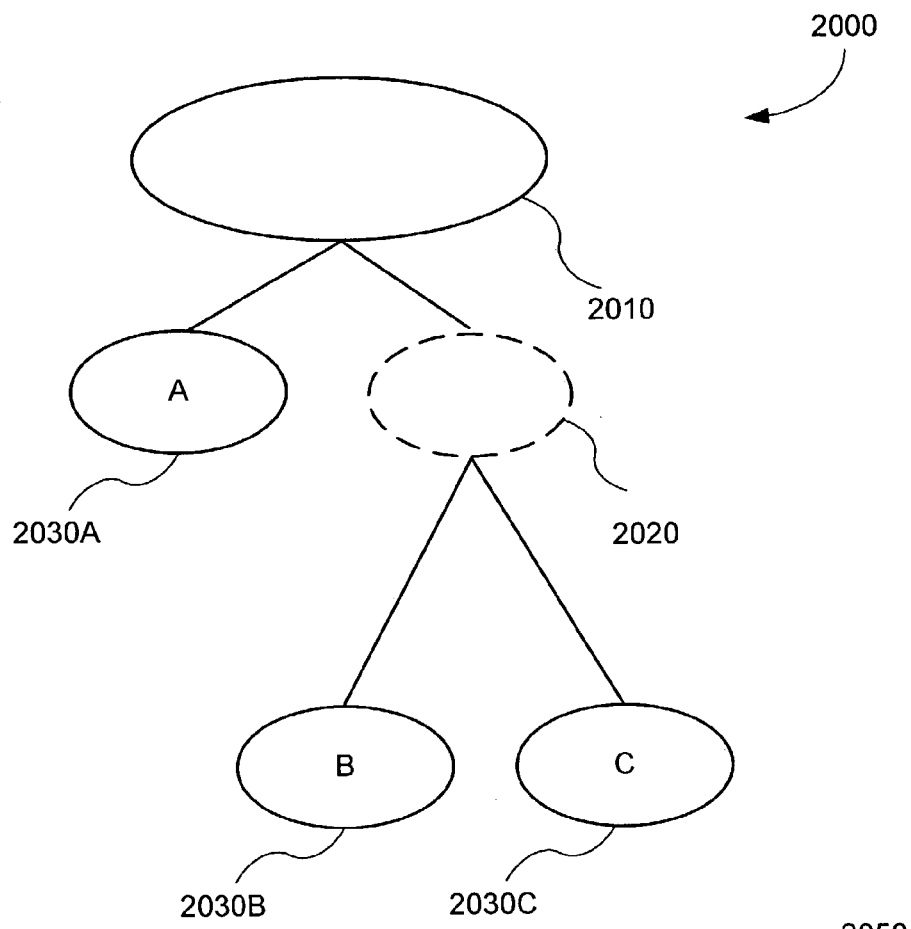
FIG. 20A is a depiction of an alternative representation of selectively exposable user nodes for a user interface element.

An alternative representation 2000 of selectively exposable nodes is shown in FIG. 20A. In the example, a particular node 2020 is specially designated as selectively exposable in a full view of the representation.

Figure 20B:
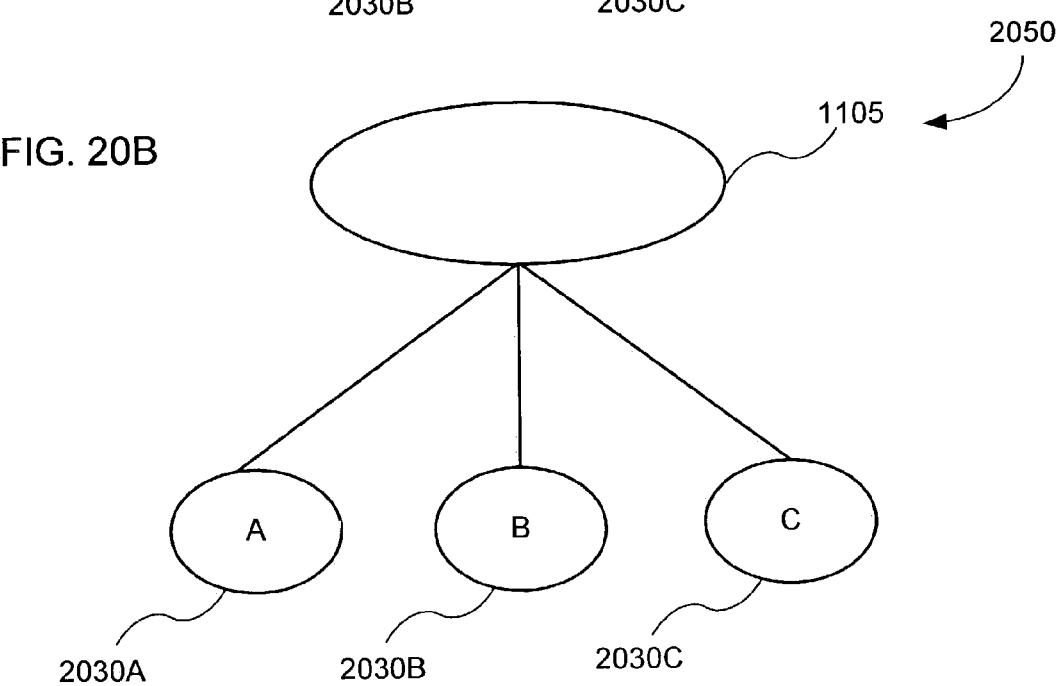
FIG. 20B is a depiction of a simplified view corresponding to the representation shown in FIG. 20A.

The corresponding simplified view 2050 is shown in FIG. 20B. As shown, children 2030B and 2030C of the particular node 2020 are considered to be siblings of the children (e.g., the node 2030A) of the parent node 2010. In other words, the children 2030B and 2030C of the particular node 2020 are considered to be siblings of the siblings of the particular node 2020 (e.g., the sibling 2030A in the full view).

Such an implementation can be achieved in a variety of ways. In one example, a special property (e.g., "Hidden Container") is set to true for the particular node 2020, which is not exposed when a simplified view is requested.

Exemplary Implementation of Alternative Representation

Figure 21:
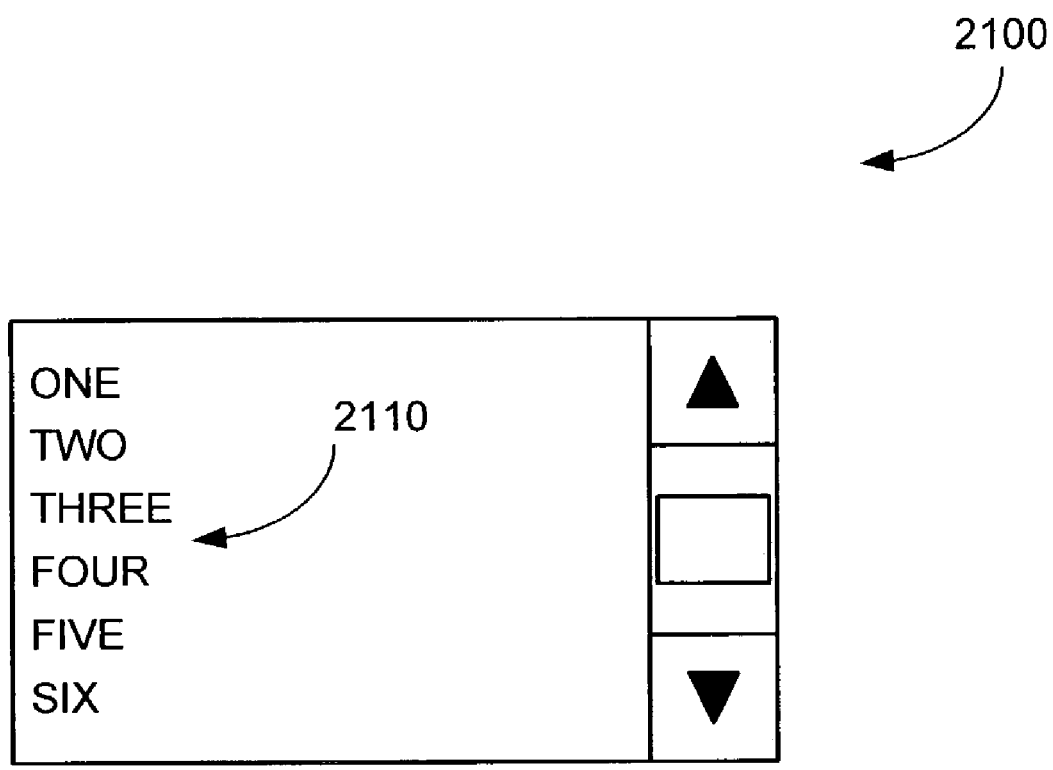
FIG. 21 is a screen shot of a list box user interface element that makes use of a repeater feature.

In some user interface element scenarios, it may desirable to generate nodes from a specified location (e.g., from a database). For example, FIG. 21 illustrates an exemplary list box 2100. It may be desirable to generate one or more of the list items 2110 from a database or other data source.

One such method of generating content from a database is to include a special element within the hierarchical representation of a user interface element. The special element can remain unexposed for the simplified view but still operate to generate the content and be present in the full view. If desired, the special element can be bound to a data source to automatically insert the content into user interface elements, such as the list items 2110.

Figure 22:
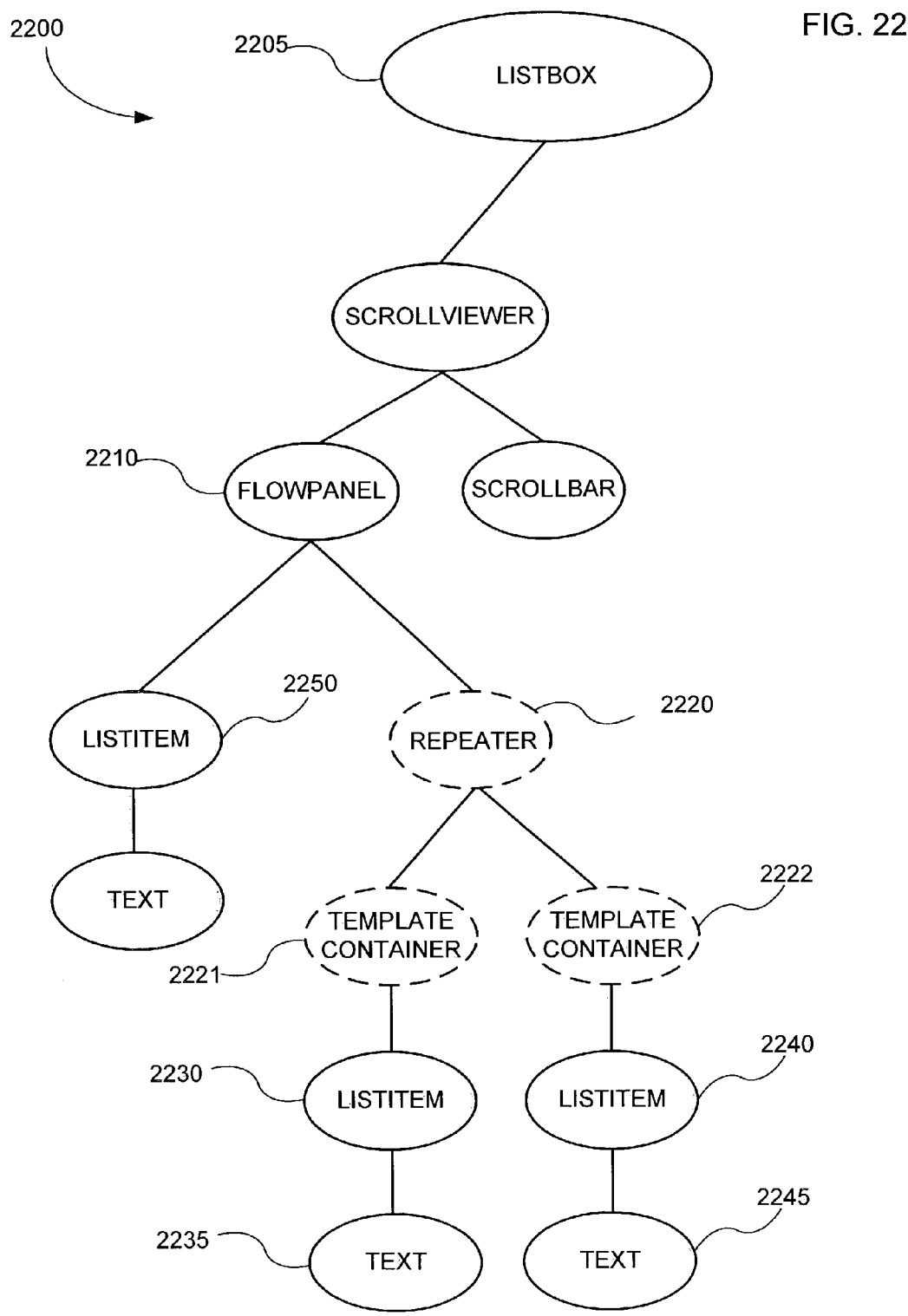
FIG. 22 is a depiction of an exemplary hierarchical representation of a user interface element including a repeater.

One such special element is called a "repeater." FIG. 22 illustrates a hierarchical representation 2200 of a list box (e.g., such as that shown in FIG. 21) comprising a repeater node 2220 inserted into the hierarchical representation for automatically generating some of the list items such as list items 2230 and 2240.

Using repeaters also allows user interface developers to automatically generate content by binding the repeater to a collection of records (e.g. from a database). Furthermore, template containers 2221 and 2222 can be associated with a repeater 2220 to contain information related to the specific record in a database that is generating content for a specific child of the repeater. In this example, the list items 2230 and 2240 are bound to records of a data source to generate text content 2235 and 2245 (e.g., name, location, or another field of a record). Although FIG. 22 shows only a single child element (list items 2235 and 2240) associated with each of the template containers 2221 and 2222, it is possible to have multiple children elements (e.g. a phone number, name, and image of a person).

In the full view of the hierarchical representation 2200 of the list box, it appears as though the repeater 2220 is one of the child nodes of the list box node 2205 and the flow panel node 2210. The template containers 2221 and 2222 appear as children of the repeater 2220.

However, programs invoking the definition of the list box may not expect to see a repeater as a child of the flow panel node 2210. Also, the definition of a list box may have rules set so that it not accept anything other than a list item as a child of the flow panel 2210. Therefore, the repeater 2220 and the template containers 2221 and 2222 are not desired to be exposed (e.g., should be hidden) within the hierarchical representation of a list box when a simplified view is used.

Figure 23:
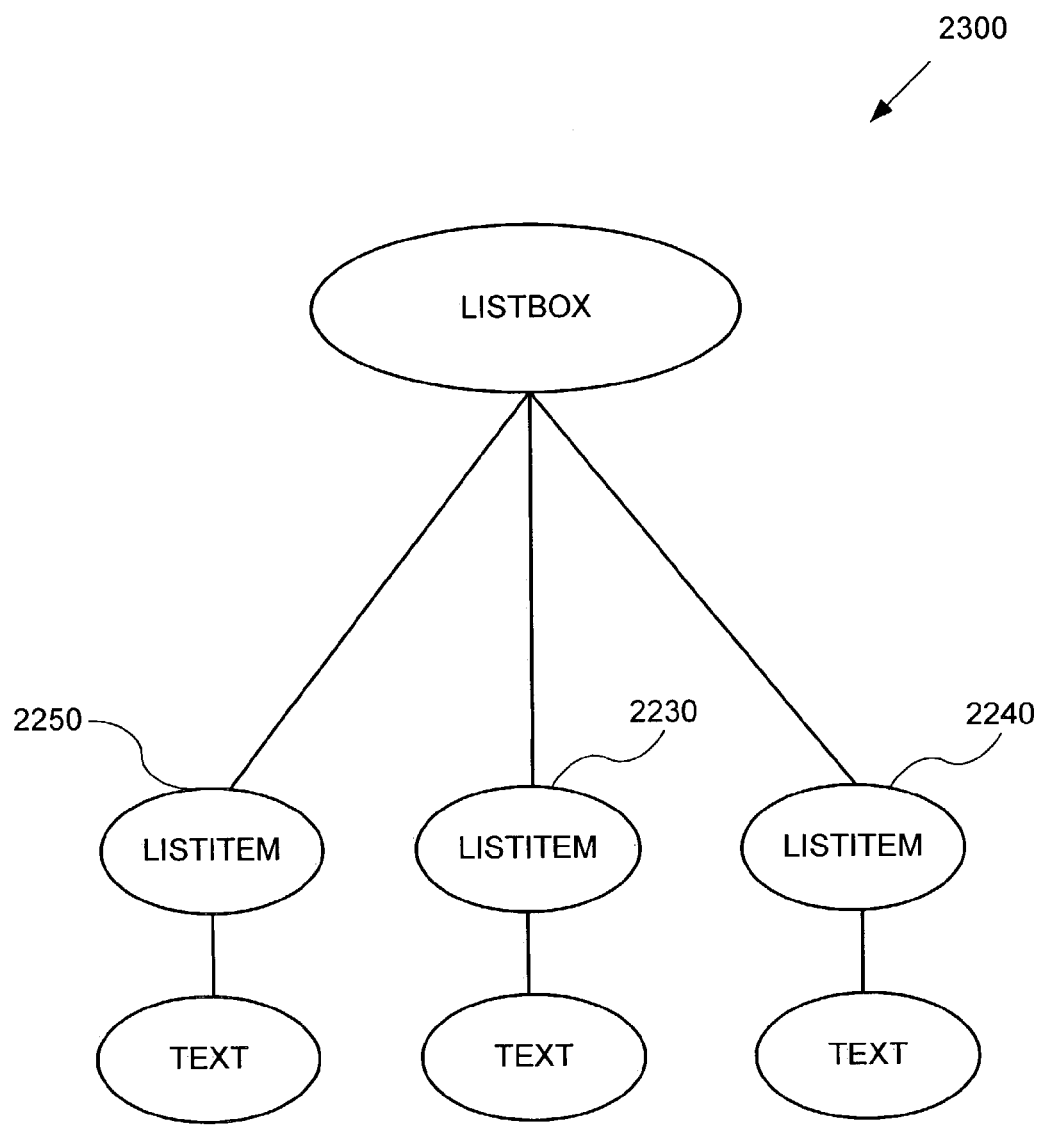
FIG. 23 is a depiction of an exemplary simplified view corresponding to FIG. 22.

By not exposing the repeater 2220 and the template containers 2221 and 2220 in a simplified view of the hierarchical representation of a list box, the list items 2230 and 2240 are effectively promoted as siblings of the siblings of their parent, the repeater 2220 (e.g., siblings of the list item node 2250). Such a simplified view 2300 is shown in FIG. 23 where the repeater 2220 of FIG. 22 is not exposed, and the list items 2230, 2240 and 2250 appear as siblings in FIG. 23.

Creating an Exemplary Alternative Representation

Figure 24:
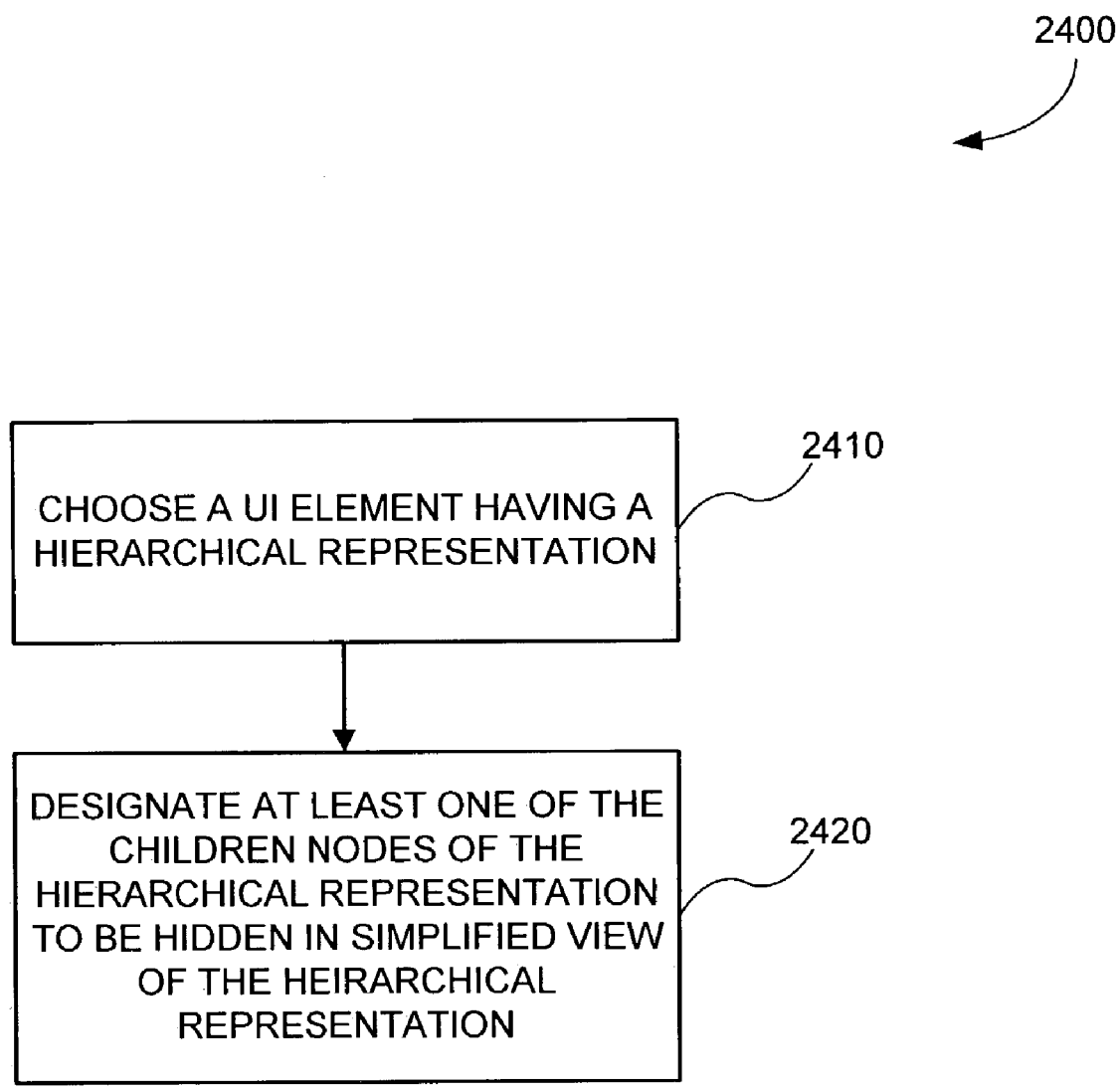
FIG. 24 is a flowchart of an exemplary method for creating a hierarchical representation of a user interface element including a repeater, such as that of FIG. 22.

An exemplary method 2400 for creating an alternative representation of a selectively exposable node (e.g., a repeater) is shown in FIG. 24. At 2410, a user interface element having a hierarchical representation is chosen. At 2430, at least one node of the hierarchical representation is designated to be selectively exposable (e.g., not exposed in a simplified view of the hierarchical representation).

For example, such a designation can be achieved by setting the "Hidden Container" property of the designated node to 'TRUE.' The repeater's class constructor can set such a property, so that the property is set whenever a repeater is instantiated.

The repeater can be activated as desired (e.g., automatically upon invocation of a user interface element defined as having the repeater). However, the invoking program need not account for the unexposed repeater, which automatically populates the list items. As far as the invoking program is concerned it is only invoking the definition of a user interface element and it has no knowledge that the user interface element is defined as having a repeater.

Or, even if the invoking program is aware of the repeater, software or markup processing the list items associated with the repeater need not be familiar with the complexities involved with the repeater. In the simplified view, the user interface element simply appears to have list items without a repeater.

Exemplary Markup Invocation of a Repeater in a User Interface Element

User interface elements can invoke repeaters in a variety of ways. One such way is via markup language (e.g., XML or HTML). FIG. 25 illustrates an exemplary 2500 a list box containing a repeater node using XML. This invocation of the repeater relies on the earlier definition of the repeater class (e.g., including an appropriate constructor) and thus, it is not necessary to designate the repeater's "Hidden Container" property as 'TRUE.'

Exemplary Programmatic Invocation of a Repeater in a User Interface Element

A repeater can also be invoked programmatically (e.g., in a programming language such as C++ or JAVA) for use in user interface elements. FIG. 26 illustrates code 2600 having an exemplary programmatic invocation of a repeater for a list box.

Exemplary Alternative Invocation of a Repeater in a User Interface Element

Figure 27:
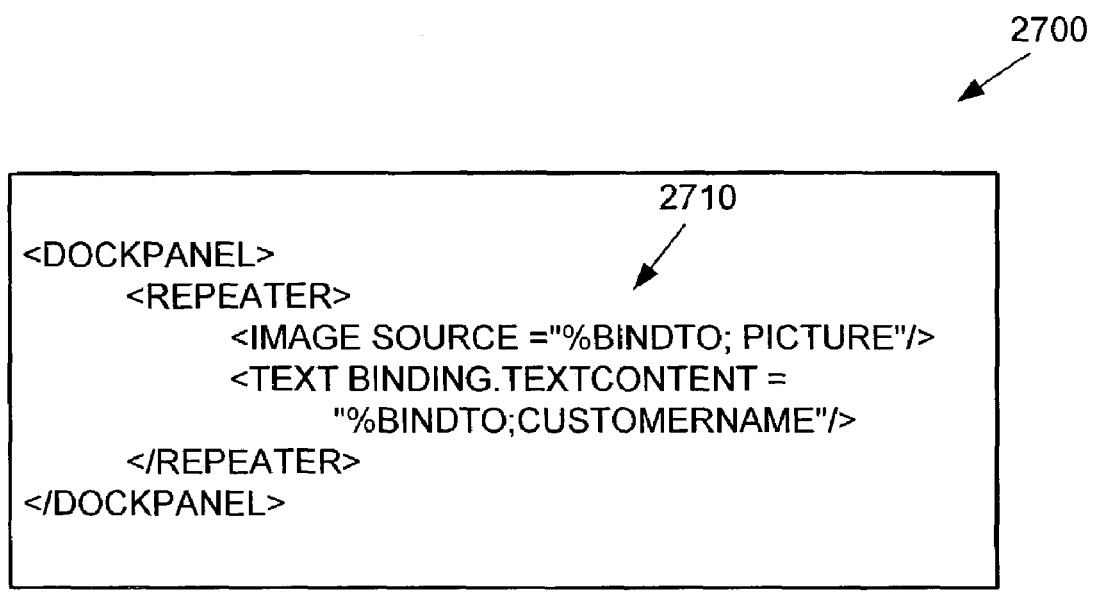
FIG. 27 is another exemplary markup invocation of a repeater designated as selectively exposable.

FIG. 27 illustrates markup language including an alternative markup invocation 2710 of a repeater in a user interface element. The example shown would result in plural (e.g., two) child nodes for a template container (e.g., the template containers 2221 and 2222): one for the picture and one for the customer name.

In any of the examples, by invoking the repeater, the invoking user or process need define only one list item (e.g., indicating a source) at 2710 to complete the list box, the resulting list items are generated by the repeater automatically upon the invocation (e.g., via reference to the source).

Figure 28:
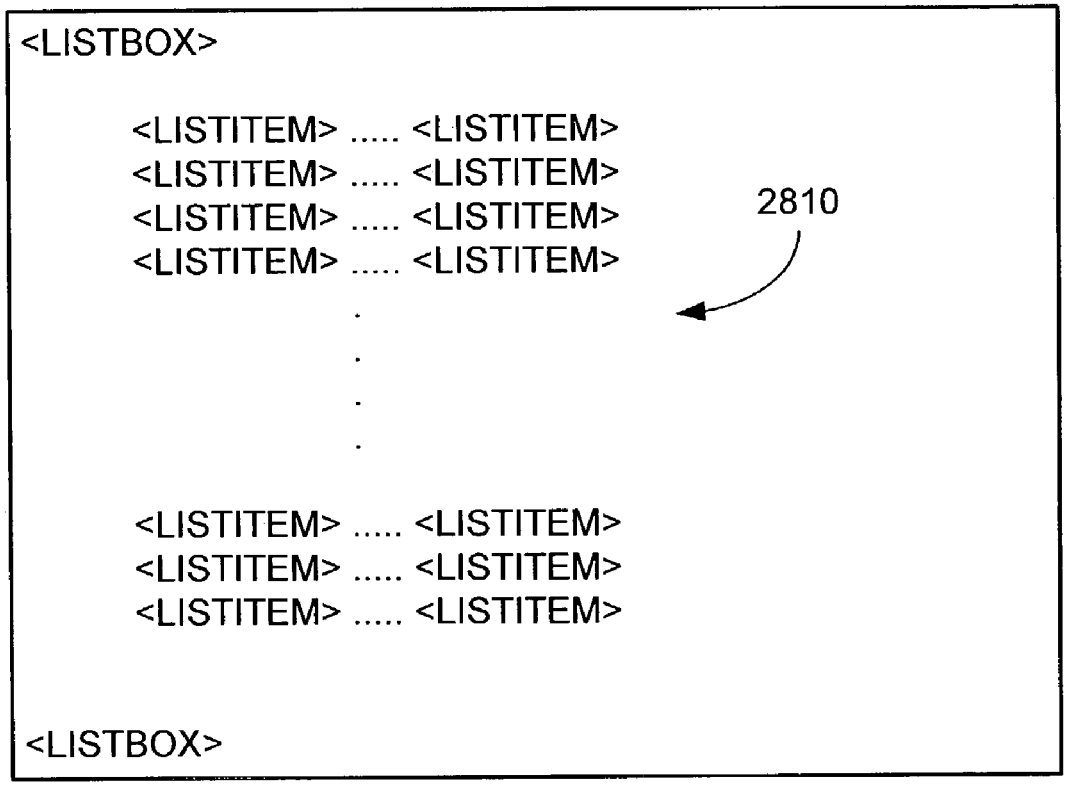
FIG. 28 is an exemplary markup definition of a list box, such as that of FIG. 21 without using the repeater feature.

FIG. 28 shows an exemplary definition of a list box with multiple list items without using the repeater feature. Accordingly, the list items 2810 are explicitly listed in the markup and will not be updated when the corresponding database is updated. The availability of a repeater (e.g., including the ability to bind to a data source) within user interface elements can thus result in more efficient code or markup when providing user interface elements having many or dynamically-updated choices.

Performing Operations Via the Alternative Representation

When operations are performed on the described representation via the simplified view, the appropriately designated node (e.g., the repeater node) designated as a "Hidden Container" is not exposed. Referring back to FIG. 22, the list items 2230 and 2240 can behave as any other list item and may be selected by the user of the rendered list box.

Furthermore, a request for the parent of the list item 2230 via the simplified view will be answered by indicating that the parent node of 2230 is the flow panel node 2210 (not the repeater 2220 or the template 2221). Thus, the nodes 2220 and 2221 (e.g., designated as a "Hidden Container") are skipped (e.g., not exposed). Alternatively, if the flow panel and scroll viewer are designated as selectively exposable, the parent of the list item 2230 would be the list box 2205 in the simplified view.

Certain functionality can be inhibited if desired. For example, it may be prohibited to add to or delete the list items 2230 and 2240 that were populated by the repeater 2220.

Exemplary Implementation of Another Alternative Representation

Another exemplary representation of a user interface element with selectively exposable nodes may be achieved by designating a node such that only the designated node is exposed in the simplified view. For example, the descendants (e.g., all descendants) of the node are considered selectively exposable and not shown in the simplified view. Such a representation would have only one node exposed for the user interface element in the simplified view.

For example, in the representation of a user interface element as shown in FIG. 20A, if the node 2010 were so designated, the descendants (e.g., the nodes 2020, 2030A, 2030B, and 2030C) are designated to be selectively exposable. The resulting representation would have only the node 2010 (e.g., the principal node) exposed in its simplified view.

If desired, an operation to add a child to such a simplified view may result in an error because the node 2010 is defined as not supporting simplified view child nodes. Performing an enumerate children operation using such a simplified view may be erroneous for the same reason, or an empty set can be provided.

Such representations can be useful to shield details of the full of view of those user interfaces that are of little interest to certain users. The described representation can be achieved in a number of ways. For example, a single property indicating that the descendants are selectively exposable can be set. The "Encapsulating Parent" container property can be set to TRUE to result in such an arrangement (e.g., if there is no corresponding node with "Encapsulating Container" set to TRUE).

Exemplary Representation of an Image

Another exemplary implementation of the technologies is to implement an internal representation of an image as having a selectively exposable child with text indicating text to be presented if the image is unavailable. The principal node can contain the image, and the selectively exposable child can represent the corresponding text. In this way, the simplified view can be manipulated without knowledge of the selectively exposable child.

Exemplary Methods of Determining Properties of Nodes

When determining which property values a node is to take on (e.g., inherit), the selectively exposable nodes can be taken into account. If desired, such nodes can be ignored (e.g., and properties taken from the principal node), such nodes can determine property values to be taken on, or the selectively exposable nodes can work in combination with the principal node to determine which property values are to be taken on. Such determination can be relevant, for example, when adding nodes to the representation.

A node in the hierarchy can indicate desired properties for other nodes via property rules (e.g., set via a style sheet). For example, a node may specify that the font property of children is to be "bold."

For example, in FIG. 10A, if the property rules say that the font property of children of the principal node 1005 is to be 'bold,' but the property rules associated with the list box node 1025 call for its children to have a font property of 'italic,' it is ambiguous as to what the property of a list item such as 1050A should be.

In one implementation, the inheritable property of a child node that is not selectively exposable is inherited from the nearest parent in the simplified view. In the example above, if the simplified view is as shown in FIG. 11, the nearest parent in the simplified view for the list items 1050A, 1050B, and 1050C is the principal node 1105. Therefore, in this embodiment the font property of the combo box will be taken on by the list items.

In another implementation, the nearest parent in the simplified view may include rules for inquiring whether any of the property rules of any of its selectively exposable child nodes should be applied to the children nodes that are not selectively exposable. For example, a process applying property rules may inquire whether the property rules associated with the list box need to be applied to the list items instead of the property rules associated with the combo box.

In another implementation, the properties of the children nodes of a hidden container as described above may be determined from property rules set by the hidden container itself and not the immediate parent node in the simplified view of the hierarchical representation.

If desired, a combination of the implementations can be provided by which flexible property determination can be supported.

Facilitating Composite User Interface Elements

The various technologies described herein can be used to facilitate defining, creating, and interacting with composite user interface elements. For example, an invocation can be a simple indication of a particular user interface element that happens to be a composite user interface. The invocation can result in the creation of plural nodes to represent the user interface element.

However, the programmer defining the composite user interface element can take steps to indicate that various of the nodes are selectively exposable. Thus, a programmer invoking the definition may choose to program to the simplified view (or by default be provided such a view) in which such nodes are not exposed. In such a case, the programmer invoking the definition need not be aware that the composite control is indeed composed of plural nodes.

Further, those defining additional controls can nest composite controls within their control definitions. The indication of which nodes are to be selectively exposable can be preserved so that nesting can be easily accomplished. In this way, a first composite control can be defined as containing a second composite control, and the simplified view will be presented correctly (e.g., nodes designated as selectively exposable for the second composite control will be selectively exposable for the second composite control). If desired, the principal node of the second composite control can also be indicated to be selectively exposable.

An example helpful for illustrating nesting includes the programmatic definition of a combo box shown in FIGS. 14A and 14B. In the example, the combo box is composed of a list box. The list box definition includes setting properties to achieve selectively exposed nodes within the list box. Further, the list box itself invokes the definition of a scroll viewer, which itself sets properties to achieve selectively exposed nodes within the scroll view. However, to software or mark up accessing the combo box, nesting can be implemented so that the internal details of the list box (e.g., including the selectively exposable nodes therein) do not appear (e.g., when accessing the simplified view of the combo box).

On the other hand, operations performed on the list box can still take advantage of the fact that nodes therein are selectively exposable (e.g., when performing an operation on the list box in a simplified view). Thus, selective exposability can be both nestable and relative.

Alternatives

Having described and illustrated the principles of our invention with reference to the illustrated embodiments, it will be recognized that the illustrated embodiments can be modified in arrangement and detail without departing from such principles.

For example, various user interface elements can be combined together and nested to provide more complex representations. The user interface element can be provided as part of an interface to a program or embedded within a document (e.g., a web page or a word processing document). The technologies described herein may also be applied to any other document or file that can be represented in a hierarchical form.

Although particular property names are used above, other property schemes can be used to selectively expose nodes in a hierarchical representation.

It should be understood that the programs, processes, or methods described herein are not related or limited to any particular type of computer apparatus. Various types of general purpose or specialized computer apparatus may be used with or perform operations in accordance with the teachings described herein. Actions described herein can be achieved by computer-readable media comprising computer-executable instructions for performing such actions. Elements of the illustrated embodiment shown in software may be implemented in hardware and vice versa. In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of processing a request to perform an operation on a hierarchical representation of a user interface element, the method comprising:

receiving the request to perform the operation, wherein the operation is performable on a full view of the hierarchical representation and the operation is performable on a simplified view of the hierarchical representation, and wherein the operation comprises adding one or more child nodes to a node in the hierarchical representation; and responsive to receiving the request to perform the operation comprising adding the one or more child nodes to the node in the hierarchical representation, performing the operation for the simplified view of the hierarchical representation of the user interface element by adding the one or more child nodes to a descendant of the node in the hierarchical representation instead of adding the one or more child nodes to the node in the hierarchical representation, wherein nodes are designated as selectively exposable in the hierarchical representation by setting properties on the nodes in the hierarchical representation, and wherein the descendent of the node is associated with a property designating the descendent of the node as receiving simplified view children;

wherein definition of the hierarchical representation indicates at least one node is selectively exposable; and the at least one node indicated as selectively exposable is not exposed for the simplified view.

2. The method of claim 1 wherein:

the hierarchical representation comprises a plurality of nodes forming a composite user inter-face element; and a proper subset of the nodes forms a user interface element within the composite user interface element.

3. The method of claim 1 wherein the operation is performed by skipping nodes in the hierarchical representation designated as selectively exposable in the simplified view.

4. The method of claim 1 further comprising:

performing a second operation comprising enumerating child nodes of a second node in the hierarchical representation; and the second operation is performed on the simplified view, whereby at least one immediate child of the second node is not exposed in the simplified view.

5. The method of claim 1 further comprising:
performing a second operation comprising providing a parent node of a second node in the hierarchical representation; and
the second operation is performed on the simplified view, whereby an immediate parent of the second node is not exposed in the simplified view.

6. The method of claim 1 further comprising:
performing a second operation comprising providing properties for a second node in the hierarchical representation; and
properties of at least one selectively exposed ancestor node of the second node are ignored.

7. The method of claim 1 further comprising:
performing a second operation comprising providing properties for a second node in the hierarchical representation; and
properties of at least one selectively exposed ancestor node of the second node are selectively ignored or considered based on the property.

8. The method of claim 1 further comprising:
performing a second operation comprising providing properties for a second node in the hierarchical representation; and
property rules of at least one selectively exposed ancestor node of the second node are ignored.

9. The method of claim 1 further comprising:
performing a second operation comprising providing properties for a second node in the hierarchical representation; and
rules of at least one selectively exposed ancestor node of the second node are selectively ignored or considered based on the property.

10. A computer-readable medium comprising computer-executable instructions for performing the method of claim 1.

11. A method of representing a user interface element, the method comprising:
creating a hierarchical representation of the user interface element having a plurality of nodes;
wherein the creating comprises invoking a definition of the user interface element, the definition designating at least one node in the representation as selectively exposable, wherein at least one of the designated at least one node is designated as a node to receive simplified view children of an ancestor node, wherein receiving simplified view children of the ancestor node comprises receiving a request to add one or more child nodes to the ancestor node and performing the request by adding the one or more child nodes to the node designated to receive simplified view children of the ancestor node instead of adding the one or more child nodes to the ancestor node, wherein nodes are designated as selectively exposable in the hierarchical representation by setting properties on the nodes in the hierarchical representation, wherein the node designated to receive simplified view children is so designated by setting a property on the node designated to receive simplified view children;
the at least one node designated as selectively exposable is not exposed for a simplified view of the hierarchical representation; and
the at least one node designated as selectively exposable is exposed for a full view of the hierarchical representation.

12. The method of claim 11 wherein the designated at least one node is designated as selectively exposable by setting a property on an ancestor of the designated at least one node.

13. The method of claim 12 wherein the designated at least one node is designated as selectively exposable by setting a property on a parent of the designated at least one node.

14. The method or claim 11 wherein the designated at least one node is so designated by setting a property on the designated at least one node.

15. The method of claim 11 wherein the designated at least one node is one of a plurality of nodes comprising a user interface element nested within a composite user interface element.

16. The method of claim 11 wherein:
the designated at least one node is one of a plurality of nodes representing the user interface element;
the nodes representing the user interface element comprise at least one node not defined as selectively exposable within a definition of the user interface element;
the nodes representing the user interface element are nested within a composite user interface element; and
the composite user interface element includes an indication that the nodes representing the user interface element are designated as selectively exposable;
the method further comprising:
treating the at least one node not defined as selectively exposable as not selectively exposable when referenced via one of the nodes representing the user interface element; and
otherwise treating the at least one node not defined as selectively exposable as selectively exposable.

17. The method of claim 11 wherein the designated at least one node is operable to provide data for generating a plurality of nodes underneath the designated at least one node in the hierarchical representation.

18. The method of claim 17 wherein the data originates from a database.

19. The method of claim 17 wherein the plurality of nodes underneath the designated at least one node are, list items.

20. A method of defining a composite user interface element, the method comprising:
referring to a plurality of definitions for user interface elements in a composite user interface definition;
in the composite user interface definition, designating at least one node for the user interface elements as selectively exposable; and
in the composite user interface definition, designating at least one of the designated at least one node as a node to receive simplified view children of an ancestor node, wherein receiving simplified view children of the ancestor node comprises receiving a request to add one or more child nodes to the ancestor node and performing the request by adding the one or more child nodes to the node designated to receive simplified view children of the ancestor node instead of adding the one or more child nodes to the ancestor node, wherein nodes are designated as selectively exposable in a hierarchical representation by setting properties on the nodes in the hierarchical representation, wherein the node designated to receive simplified view children is so designated by setting a property on the node designated to receive simplified view children;

wherein the at least one node designated as selectively exposable is not exposed for a simplified view of the composite user interface element;

the at least one node designated as selectively exposable is exposed for a full view of the composite user interface element; and the composite user interface element comprises a combo box.

21. The method or claim 20 wherein:

at least one of the definitions for user interface elements itself designates one of the nodes therein as selectively exposable; and the at least one node designated therein is not exposed for the simplified view.

22. The method of claim 20 wherein the designated at least one node is designated as selectively exposable by appropriately designating properties of one or more of the following:

a node for the user interface elements;

a parent node for the user interface elements; and an ancestor node for the user interface elements.

23. A method comprising:

invoking the composite user definition or claim 20; and responsive to a request for a simplified view of a representation of the composite user interface element, not exposing the selectively exposable nodes of the user interface elements.

24. A computer-readable medium having encoded thereon a data structure representing an encapsulated user interface element, the data structure comprising:

a principal node;

one or more selectively exposable nodes hierarchically related to the principal node; and a designation of which node out of the selectively exposable nodes is to receive children of the principal node when the selectively exposable nodes are unexposed in the simplified view, wherein receiving simplified view children of the principal node comprises receiving a request to add children to the principal node and performing the request by adding the children to the node designated to receive simplified view children of the principal node instead of adding the children to the principal node, wherein nodes are designated as selectively exposable in a hierarchical representation by setting properties on the nodes in the hierarchical representation, wherein the node designated to receive simplified view children is so designated by setting a properly on the node designated to receive simplified view children;

wherein the one or more selectively exposable nodes are not exposed for a simplified view of the data structure; and the one or more selectively exposable nodes are exposed for a full view of the data structure.

25. A user interface service comprising:

code for accepting a definition of a user interface element, wherein the definition comprises a designation of a simplified view and a full view;

code for creating a hierarchical representation of the user interface element based on the definition;

code responsive to a request for performing an operation on the hierarchical representation via the simplified view; and a computer apparatus for executing the code for accepting the definition, the code for creating the hierarchical representation, and the code for performing the operation;

wherein the operation is performable on a full view of the hierarchical representation and the operation is performable on a simplified view of the hierarchical representation, wherein the operation comprises adding one or more child nodes to a node in the hierarchical representation, and wherein the operation is performed by adding the one or more child nodes to a descendant of the node in the hierarchical representation instead of adding the one or more child nodes to the node in the hierarchical representation, wherein nodes are designated as selectively exposable in the hierarchical representation by setting properties on the nodes in the hierarchical representation, and wherein the descendent of the node is associated with a property designating the descendent of the node as receiving simplified view children.

26. The user interface service of claim 25 wherein the simplified view comprises at least one selectively exposable node.

27. A user interface service comprising:

means for accepting a definition of a user interface element, wherein the definition comprises a designation of a simplified view and a full view;

means for creating a hierarchical representation of the user interface element based on the definition; and means responsive to a request for performing an operation on the hierarchical representation via the simplified view;

wherein the operation is performable on a full view of the hierarchical representation and the operation is performable on a simplified view of the hierarchical representation, wherein the operation comprises adding one or more child nodes to a node in the hierarchical representation, and wherein the operation is performed by adding the one or more child nodes to a descendant of the node in the hierarchical representation instead of adding the one or more child nodes to the node in the hierarchical representation, wherein nodes are designated as selectively exposable in the hierarchical representation by setting properties on the nodes in the hierarchical representation, and wherein the descendent of the node is associated with a property designating the descendent of the node as receiving simplified view children.

28. A method for performing a user interface element-related operation, the method comprising:

receiving a definition of a hierarchical representation of the user interface element having a simplified view and a full view;

invoking the definition; and performing the operation on the simplified view of the hierarchical representation of the user interface element;

wherein the operation is performable on a full view of the hierarchical representation and the operation is performable on a simplified view of the hierarchical representation, wherein the operation comprises adding one or more child nodes to a node in the hierarchical representation, and wherein the operation is performed by adding the one or more child nodes to a descendant of the node in the hierarchical representation instead of adding the one or more child nodes to the node in the hierarchical representation, wherein nodes are designated as selectively exposable in the hierarchical representation by setting properties on the nodes in the hierarchical representation, and wherein the descendent of the node is associated with a property designating the descendent of the node as receiving simplified view children.

29. The method of claim 28 wherein the defining comprises:

selectively, defining nodes within a full view of the hierarchical representation of the user interface as being unexposed in the simplified view.

30. The method of claim 29, wherein the nodes in the full view are defined as being unexposed in the simplified view by appropriately setting properties of nodes comprising the hierarchical representation.

* * * * *

UNITED STATES PATENT AND TRADEMARK OFFICE
CERTIFICATE OF CORRECTION

| | | |
|---|---|---|
| PATENT NO. | : 7,337,401 B2 | Page 1 of 2 |
| APPLICATION NO. | : 10/323504 | |
| DATED | : February 26, 2008 | |
| INVENTOR(S) | : Peter Francis Ostertag et al. | |

It is certified that error appears in the above-identified patent and that said Letters Patent is hereby corrected as shown below:

In column 5, line 7, delete "of" and insert -- from --, therefor.

In column 5, line 8, delete "element" and insert -- elements --, therefor.

In column 5, line 14, delete "definition" and insert -- definitions --, therefor.

In column 5, line 54, after "representation" insert -- 100 --.

In column 6, line 17, delete "is" and insert -- if --, therefor.

In column 6, line 61, after "method" insert -- 600 --.

In column 7, line 59, after "method" insert -- 800 --.

In column 16, line 6, after "it" insert -- will --.

In column 16, line 26, delete "2430" and insert -- 2420 --, therefor.

In column 16, line 53, after "exemplary" delete "2500 a".

In column 16, line 53, after "box" insert -- 2500 --.

In column 19, line 42, delete "mark up" and insert -- markup --, therefor.

In column 20, line 54, in Claim 2, delete "inter-face" and insert -- interface --, therefor.

In column 22, line 9, in Claim 14, delete "or" and insert -- of --, therefor.

In column 22, line 43, in Claim 19, delete "are," and insert -- are --, therefor.

Signed and Sealed this
Fifteenth Day of February, 2011

David J. Kappos
*Director of the United States Patent and Trademark Office*

CERTIFICATE OF CORRECTION (continued)
U.S. Pat. No. 7,337,401 B2

In column 23, line 9, in Claim 21, delete "or" and insert -- of --, therefor.

In column 23, line 23, in Claim 23, delete "or" and insert -- of --, therefor.

In column 23, line 48, in Claim 24, delete "properly" and insert -- property --, therefor.

In column 26, line 1, in Claim 29, delete "selectively," and insert -- selectively --, therefor.